US012440713B2

(12) United States Patent
Troutt et al.

(10) Patent No.: US 12,440,713 B2
(45) Date of Patent: Oct. 14, 2025

(54) SYSTEMS AND METHODS FOR ELECTRONICALLY CONTROLLING DISCHARGE NOZZLES

(71) Applicant: Tyco Fire Products LP, Lansdale, PA (US)

(72) Inventors: Sean S. Troutt, Stephenson, MI (US); Adam Staszak, Marinette, WI (US)

(73) Assignee: Tyco Fire Products LP, Cranston, RI (US)

( * ) Notice: Subject to any disclaimer, the term of this patent is extended or adjusted under 35 U.S.C. 154(b) by 673 days.

(21) Appl. No.: 17/615,651

(22) PCT Filed: Jun. 2, 2020

(86) PCT No.: PCT/IB2020/055203

§ 371 (c)(1),
(2) Date: Dec. 1, 2021

(87) PCT Pub. No.: WO2020/245725

PCT Pub. Date: Dec. 10, 2020

(65) Prior Publication Data

US 2022/0305314 A1 Sep. 29, 2022

Related U.S. Application Data

(60) Provisional application No. 62/856,237, filed on Jun. 3, 2019.

(51) Int. Cl.

| | |
|---|---|
| ***A62C 37/40*** | (2006.01) |
| ***A62C 3/00*** | (2006.01) |
| ***A62C 31/00*** | (2006.01) |

(52) U.S. Cl.

CPC .............. *A62C 37/40* (2013.01); *A62C 3/006* (2013.01); *A62C 31/005* (2013.01)

(58) Field of Classification Search

CPC ....... A62C 31/005; A62C 31/02; A62C 31/03; A62C 35/60; A62C 35/605; A62C 35/62; A62C 37/40; A62C 3/006

(Continued)

(56) References Cited

U.S. PATENT DOCUMENTS

| | | | |
|---|---|---|---|
| 7,162,332 | B2 | 1/2007 | Pillar et al. |
| 7,715,962 | B2 | 5/2010 | Rowe et al. |

(Continued)

FOREIGN PATENT DOCUMENTS

| | | |
|---|---|---|
| CN | 105457195 | 4/2016 |
| CN | 106345088 | 1/2017 |

(Continued)

OTHER PUBLICATIONS

International Search Report and Written Opinion on International Application No. PCT/IB2020/055203, mail date Sep. 4, 2020, 14 pages.

*Primary Examiner* — Cody J Lieuwen
(74) *Attorney, Agent, or Firm* — Foley & Lardner LLP

(57) ABSTRACT

A fire suppression system includes a controller. The controller is configured to receive sensor data regarding a fire condition from a sensor. The controller is also configured to determine a fire suppression response profile based on the sensor data. The controller is also configured to selectively control a flow rate of each of multiple electronically controllable variable flow rate nozzles over time to provide a fire suppressant agent to multiple zones according to the fire suppression response profile.

20 Claims, 8 Drawing Sheets

(58) Field of Classification Search
USPC ........................................................ 169/61, 60
See application file for complete search history.

(56) References Cited

U.S. PATENT DOCUMENTS

| | | | | |
|---|---|---|---|---|
| 2002/0036090 | A1* | 3/2002 | Gil | A62C 37/40 169/57 |
| 2002/0070035 | A1 | 6/2002 | Grabow et al. | |
| 2010/0274397 | A1 | 10/2010 | Lozier et al. | |
| 2010/0294518 | A1 | 11/2010 | Lelic et al. | |
| 2013/0000927 | A1 | 1/2013 | Meier et al. | |
| 2014/0158382 | A1 | 6/2014 | Ferguson et al. | |
| 2015/0136430 | A1 | 5/2015 | Livchak et al. | |
| 2016/0051848 | A1* | 2/2016 | Klarlund | A62C 3/0292 169/61 |
| 2016/0175869 | A1* | 6/2016 | Sullivan | A01M 7/0042 239/11 |
| 2016/0271434 | A1* | 9/2016 | Dusing | H04L 67/12 |
| 2016/0354626 | A1 | 12/2016 | McNamara et al. | |
| 2017/0359943 | A1* | 12/2017 | Calleija | A01M 7/0089 |
| 2018/0200552 | A1 | 7/2018 | Wertsberger | |
| 2019/0168045 | A1* | 6/2019 | Griffin | A62C 3/006 |

FOREIGN PATENT DOCUMENTS

| | | | |
|---|---|---|---|
| CN | 109091787 | | 12/2018 |
| EP | 3 461 537 | A1 | 4/2019 |
| KR | 10-2018-0021447 | A | 3/2018 |

* cited by examiner

SYSTEMS AND METHODS FOR ELECTRONICALLY CONTROLLING DISCHARGE NOZZLES

CROSS-REFERENCE TO RELATED PATENT APPLICATION

This application claims the benefit of and priority to U.S. Provisional Application No. 62/856,237, filed Jun. 3, 2019, the entire disclosure of which is incorporated by reference herein.

BACKGROUND

Fire suppression systems are commonly used to protect an area and objects within the area from fire. Fire suppression systems can be activated manually or automatically in response to an indication that a fire is present nearby (e.g., an increase in ambient temperature beyond a predetermined threshold value, etc.). Once activated, fire suppression systems spread a fire suppressant agent throughout the area. The fire suppressant agent then extinguishes or prevents the growth of the fire. Various sprinklers, nozzles, and dispersion devices are used to disperse the fire suppressant agent throughout the area.

SUMMARY

One implementation of the present disclosure is a fire suppression system including a controller. The controller is configured to receive sensor data regarding a fire condition from a sensor, according to some embodiments. The controller is also configured to determine a fire suppression response profile based on the sensor data, according to some embodiments. The controller is also configured to selectively control a flow rate of each of multiple electronically controllable variable flow rate nozzles over time to provide a fire suppressant agent to multiple zones according to the fire suppression response profile.

In some embodiments, the controller is configured to control operation of ones of the multiple electronically controllable variable flow rate nozzles that are near or at a detected fire to target and suppress the detected fire.

In some embodiments, the fire suppression system further includes the multiple electronically controllable variable flow rate nozzles and the sensor. In some embodiments, the multiple electronically controllable variable flow rate nozzles are configured to provide fire suppressant agent to the multiple zones of an area. In some embodiments, the sensor is configured to obtain sensor data regarding the fire condition at one or more of the multiple zones of the area.

In some embodiments, the controller is configured to modify the flow rate of the multiple electronically controllable variable flow rate nozzles based on the fire condition changing.

In some embodiments, the fire suppression response profile includes one or more discharge time intervals and one or more discharge rates. In some embodiments, each of the one or more discharge rates is associated with a corresponding one of the one or more discharge time intervals.

In some embodiments, the fire suppression response profile includes a feedback control scheme that uses the received sensor data of the fire condition in real-time to control operation of one or more of the multiple electronically controllable variable flow rate nozzles.

In some embodiments, the fire suppression system is configured to automatically decrease or increase a response area within a protected zone based on the fire condition.

In some embodiments, the fire suppression system is configured to automatically reactivate in response to an additional fire event occurring until an entirety of available fire suppressant agent is exhausted.

In some embodiments, the variable flow rate nozzles are pulse width modulated (PWM) nozzles configured to provide fire suppressant agent to multiple zones of an area. In some embodiments, each of the PWM nozzles are configured to independently transition between an activated state and a deactivated state.

In some embodiments, the fire suppression system further includes one or more sensors configured to measure a fire condition at one of more of the multiple zones of the area. In some embodiments, the controller is configured to receive the measurements of the fire condition from the one or more sensors, and detect a fire presence in any of the zones of the area based on the received measurements of the fire condition.

In some embodiments, the controller is further configured to generate a pulse width modulation signal based on the fire suppression response profile and provide the pulse width modulation signal to one or more of the plurality of PWM nozzles to operate the PWM nozzles to suppress a detected fire according to the fire suppression response profile.

In some embodiments, determining the fire suppression response profile includes selecting a fire suppression response profile from a database of fire suppression response profiles.

In some embodiments, the controller is configured to select the fire suppression response profile from the database based on at least one of a whether a fire is detected in any of the multiple zones of the area, a location of the fire detected in any of the zones of the area, and an appliance type at the location of the fire.

In some embodiments, the controller is configured to receive an update from a remote or local device to reconfigure the database with new fire suppression response profiles.

In some embodiments, the controller is configured to provide the pulse width modulation signals to one or more of the multiple PWM nozzles that are near the detected fire to suppress the detected fire.

In some embodiments, the fire suppression system further includes multiple sets of the one or more sensors. In some embodiments, each set of one or more sensors is configured to measure fire conditions at a corresponding zone of the area.

In some embodiments, the fire suppression response profile is a control scheme. In some embodiments, the controller is configured to input real-time measurements of the fire condition to the control scheme to operate the PWM nozzles.

In some embodiments, the controller is configured to actively change the pulse width modulation signals provided to the one or more PWM nozzles in response to changing fire conditions.

Another implementation of the present disclosure is a method for operating variable flow rate nozzles to suppress a fire. In some embodiments, the method includes receiving fire condition data from a sensor. In some embodiments, the method also includes detecting a fire condition based on the fire condition data. In some embodiments, the method also includes determining a fire suppression response profile in response to detecting a fire condition in any zones of an area. In some embodiments, the method also includes modifying a flow rate of one or more of the variable flow rate nozzles over time according to the fire suppression response profile to suppress a fire.

In some embodiments, determining the fire suppression response profile includes selecting a fire suppression response profile from a database of fire suppression response profiles based on at least one of whether a fire condition is detected in any of the zones of the area, a location of the fire condition detected in any of the zones of the area, or an appliance type at the location of the fire condition.

In some embodiments, the method further includes controlling the operation of one or more of the variable flow rate nozzles that are near or at the detected fire to target and suppress the detected fire. In some embodiments, the method includes activating additional ones of the variable flow rate nozzles or deactivating ones of the variable flow rate nozzles in response to the fire condition changing.

In some embodiments, the fire suppression response profile is a control scheme. In some embodiments, the controller is configured to input real-time fire condition data to the control scheme to operate the variable flow rate nozzles.

Another implementation of the present disclosure is a fire suppression system including multiple pulse width modulated (PWM) nozzles, one or more sensors, and a controller. In some embodiments, the multiple pulse width modulated (PWM) nozzles are configured to provide fire suppressant agent to multiple zones of an area. In some embodiments, each of the multiple PWM nozzles are configured to independently transition between an activated state and a deactivated state. In some embodiments, the one or more sensors are configured to obtain fire condition data at one or more of the multiple zones of the area. In some embodiments, the controller is configured to receive the fire condition data from the one or more sensors, and detect a presence of a fire condition in any of the zones of the area based on the fire condition data. In some embodiments, the controller is configured to determine a fire suppression response profile in response to detecting a presence of fire condition in any of the zones of the area. In some embodiments, the controller is configured to generate a pulse width modulation signal based on the fire suppression response profile and provide the pulse width modulation signal to one or more of the multiple PWM nozzles to operate the PWM nozzles to distribute the fire suppressant agent according to the fire suppression response profile.

In some embodiments, determining the fire suppression response profile includes selecting a fire suppression response profile from a database of fire suppression response profiles based on at least one of whether a fire is detected in any of the zones of the area, a location of the fire detected in any of the zones of the area, or an appliance type at the location of the fire.

In some embodiments, the controller is configured to receive an update from a remote or local device to update the database with new fire suppression response profiles.

In some embodiments, the fire suppression system includes multiple of the one or more sensors. In some embodiments, each of the multiple one or more sensors are configured to obtain fire condition data at a corresponding zone of the area.

In some embodiments, the controller is configured to modify the pulse width modulation signals provided to one or more of the multiple PWM nozzles based on the fire condition data changing.

In some embodiments, the fire suppression response profile includes one or more discharge time intervals and one or more discharge rates. In some embodiments, each of the one or more discharge rates is associated with a corresponding one of the one or more discharge time intervals.

In some embodiments, the fire suppression response profile is a feedback control scheme that uses the fire condition data in real-time to control operation of one or more of the multiple PWM nozzles.

In some embodiments, the fire suppression system is configured to automatically decrease or increase a response area within a protected zone based on the fire condition data.

In some embodiments, the controller is configured to receive an update from a remote or local device to reconfigure the database with new fire suppression response profiles.

In some embodiments, the controller is configured to control operation of the PWM nozzles that are near a detected fire to suppress the detected fire.

In some embodiments, the fire suppression response profile is a control scheme. In some embodiments, the controller is configured to input real-time measurements of the fire condition to the control scheme to operate the PWM nozzles.

In some embodiments, the controller is configured to actively operate the PWM nozzles in response to changing fire conditions.

In some embodiments, the controller is configured to operate one or more of the multiple PWM nozzles at a detected fire to target the detected fire.

In some embodiments, the fire suppression system is configured to automatically reactivate in response to an additional fire event occurring until an entirety of available fire suppressant agent is exhausted.

Another implementation of the present disclosure is a method for operating PWM nozzles to suppress a fire, according to some embodiments. In some embodiments, the method includes obtaining measurements of a fire condition from a sensor. In some embodiments, the method further includes detecting a fire based on the measurements of the fire condition. In some embodiments, the method further includes determining a fire suppression response profile in response to detecting a presence of fire in any zones of an area. In some embodiments, the method includes controlling an operation of one or more of the PWM nozzles according to the fire suppression response profile to suppress the fire.

In some embodiments, determining the fire suppression profile includes selecting a fire suppression response profile from a database of fire suppression response profiles.

In some embodiments, selecting the fire suppression response profile from the database includes selecting the fire suppression response profile based on at least one of whether a fire is detected in any of the zones of the area, a location of the fire detected in any of the zones of the area, and an appliance type at the location of the fire.

In some embodiments, the method further includes receiving an update from a remote or local device. In some embodiments, the update reconfigures the database with new fire suppression response profiles.

In some embodiments, the method further includes controlling the operation of the one or more nozzles that are near or proximate the detected fire to target and suppress the detected fire.

In some embodiments, the method further includes obtaining fire conditions from multiple sets of one or more sensors. In some embodiments, each set of the one or more sensors is configured to measure fire conditions at a corresponding zone of the area.

In some embodiments, the fire suppression response profile is a control scheme. In some embodiments, the method includes inputting real-time measurements of the fire condition to the control scheme to operate the PWM nozzles.

In some embodiments, the method includes actively operating the PWM nozzles in response to changing fire conditions.

In some embodiments, the method further includes controlling operation of one or more of the PWM nozzles at the detected fire to target the detected fire.

In some embodiments, the fire suppression response profile includes one or more discharge time intervals and one or more discharge rates. In some embodiments, each of the one or more discharge rates is associated with a corresponding one of the one or more discharge time intervals.

In some embodiments, the fire suppression response profile is a feedback control scheme that uses the received measurements of the fire conditions in real-time to control operation of one or more of the PWM nozzles.

In some embodiments, the method further includes automatically decreasing or increasing a response area within a protected zone based on fire conditions.

In some embodiments, the method further includes reactivating in response to an additional fire event occurring, until an entirety of available fire suppressant agent is exhausted.

DETAILED DESCRIPTION

Figure 1:
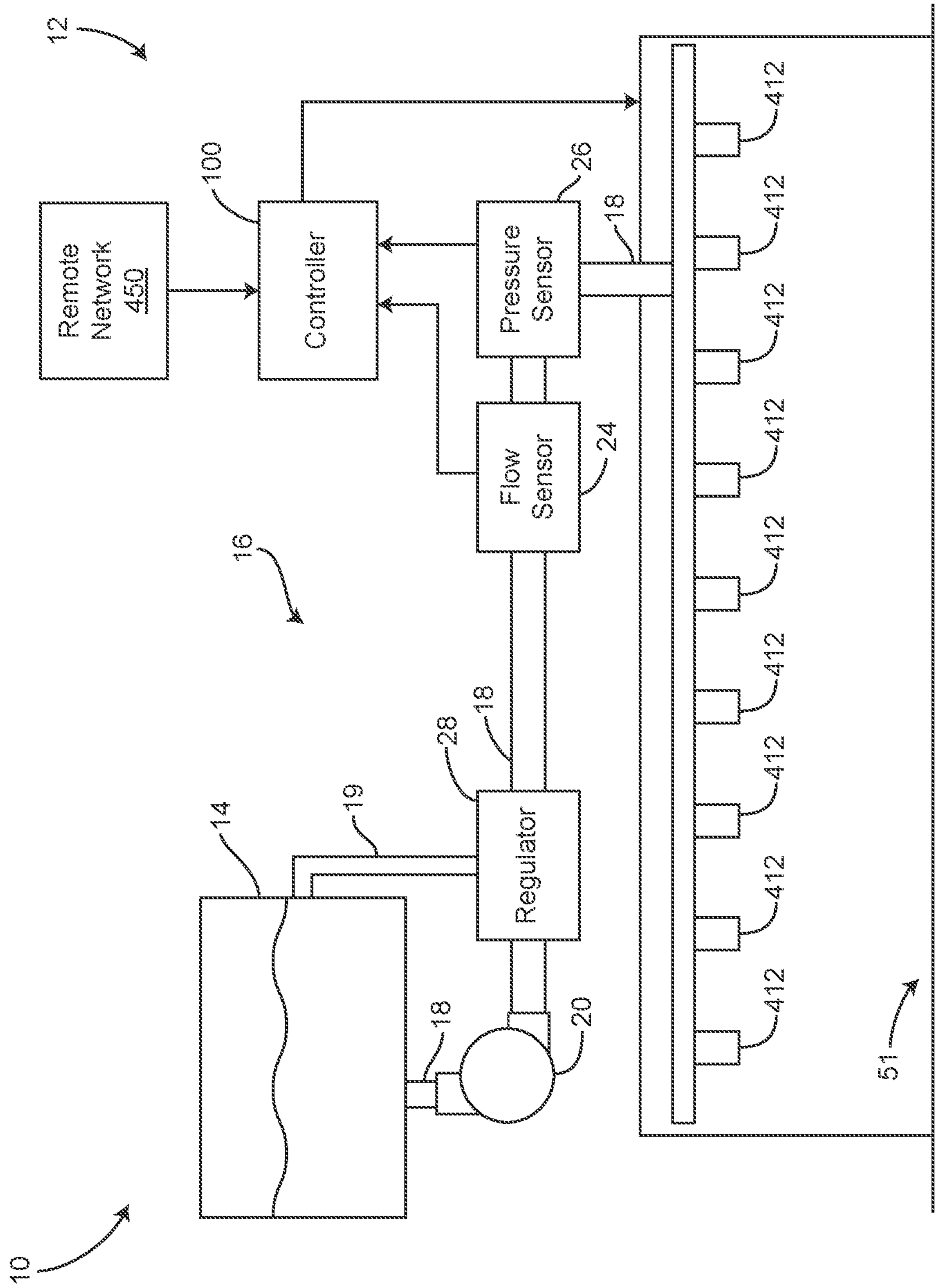
FIG. 1 is a schematic of a fire suppression system including multiple sprinklers which distribute a fire suppressant agent over an area, according to an exemplary embodiment.

Before turning to the figures, which illustrate the exemplary embodiments in detail, it should be understood that the present disclosure is not limited to the details or methodology set forth in the description or illustrated in the figures. It should also be understood that the terminology used herein is for the purpose of description only and should not be regarded as limiting.

Overview

Referring generally to the FIGURES, a fire suppression system includes pulse width modulated nozzles, and a controller configured to operate the pulse width modulated nozzles. The controller is configured to generate pulse width modulation signals and provide the pulse width modulation signals to the pulse width modulated nozzles to transition the pulse width modulated nozzles between an active state and a deactivated state. The pulse width modulated nozzles are configured to serve an area, a zone, a space, a room, etc., and various appliances, devices, systems, etc., in the areas. In some embodiments, sensors are located about the area. The sensors can be configured to measure temperature, light intensity, optical values, etc., of the area in various locations.

The controller can receive sensor feedback from the sensors in real-time and detect a fire in the area. The controller can use known locations of the sensors and/or the pulse width modulated nozzles to determine which pulse width modulated nozzles to operate in order to suppress the fire. The controller can operate the pulse width modulated nozzles at or near (e.g., surrounding) the fire to target the fire. In some embodiments, the controller operates the pulse width modulated nozzles according to a selected fire suppression response profile. The fire suppression response profile can be selected based on any of the sensor information, the location of the fire, intensity of the fire, type of appliance at the fire, etc.

The controller uses the fire suppression response profile to operate the pulse width modulated nozzles. The fire suppression response profile can include a control scheme, a set of steps, discharge time intervals and discharge rates, etc. For example, the fire suppression response profile can include a first discharge time interval and a second discharge time interval. The first and second discharge time intervals can include corresponding discharge rates. The discharge rate associated with the first discharge time interval may be greater than the discharge rate associated with the second discharge time interval. In this way, the controller can operate the pulse width modulated nozzles to provide fire suppressant agent at the first discharge rate over the first discharge time interval and at the second discharge rate over the second discharge time interval. In some embodiments, the fire suppression response profile can include any number of discharge time intervals and corresponding discharge rates (e.g., one, two, three, four, etc., discharge time intervals and corresponding discharge rates).

The controller can also implement a control scheme to suppress the fire in real-time. The controller can receive information from the sensors in real time and use the control scheme with the sensor information to operate the pulse width modulated nozzles. In some embodiments, the control scheme is appliance specific. For example, a fryer may have a different control scheme than a data center and may require different fire suppression response (e.g., different amounts of fire suppressant agent, different discharge time intervals, different discharge rates, etc.).

In some embodiments, the controller generates and uses a model to detect a fire in the area and differentiate between an actual fire and routine activities that take place in the area. The controller can receive training data and generate the model using a neural network. The controller can then use current or live sensor information as inputs to the model to detect if a fire is present in the area.

The controller can also receive program updates from a remote network, device, system, server, etc. The program updates can update the fire suppression response profiles or the control schemes used by the controller. In some embodiments, the program updates also update a mapping or location database that the controller uses to determine an approximate location of the fire. For example, if a building manager moves appliances between different zones of the area, the controller can be updated to account for the layout changes. Advantageously, this reduces the need to physically plumb or restructure the system to account for layout changes, equipment installation, appliance removal, etc. Other systems require the fire suppression system to be re-structured to account for layout changes of the area, which causes additional costs, down-time, etc.

Fire Suppression System

Figure 2:
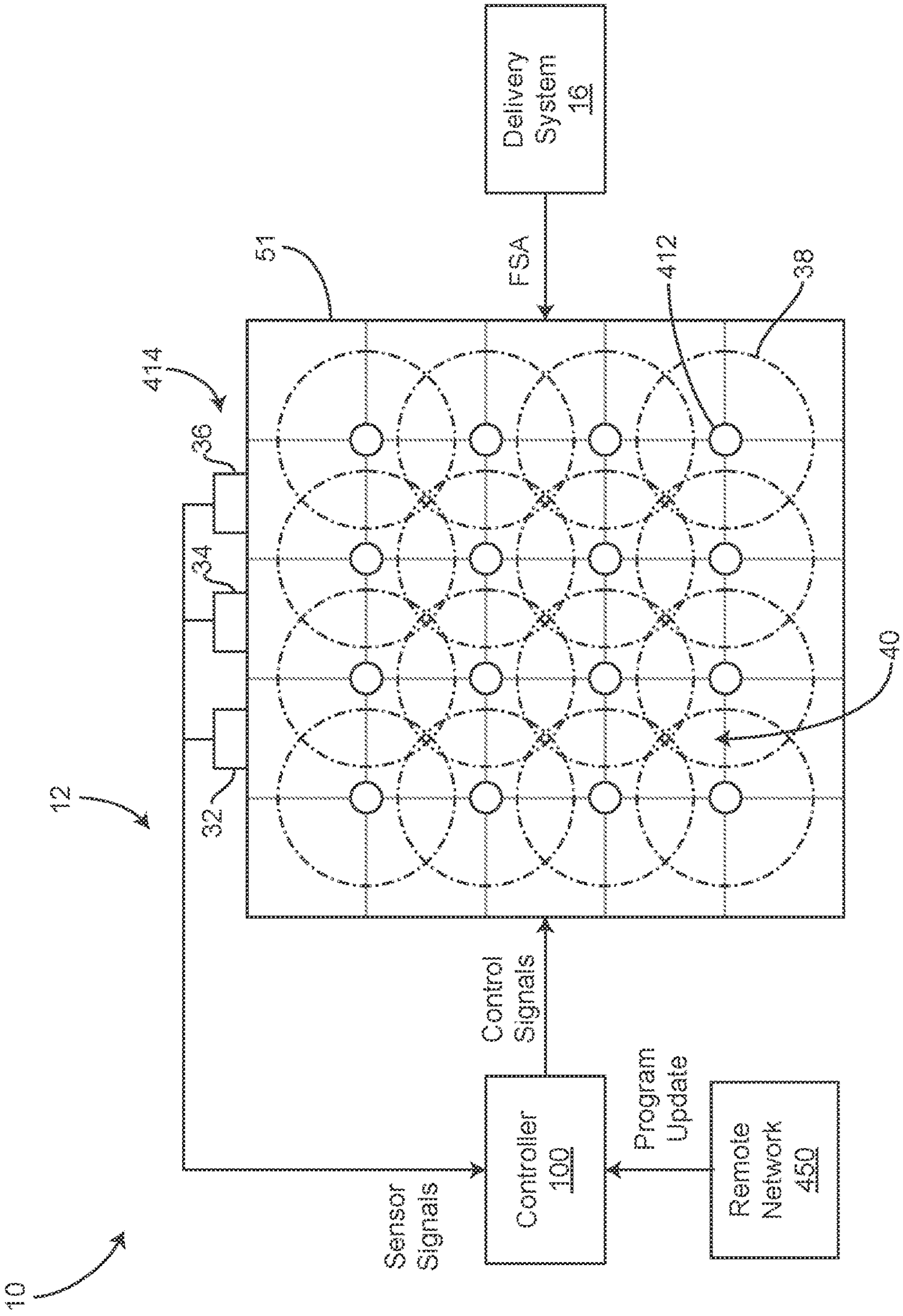
FIG. 2 is a schematic of the fire suppression system of FIG. 1, including multiple zones or areas and sprinklers, according to an exemplary embodiment.

Referring now to FIGS. 1 and 2, a fire suppression system 10 is shown, according to an exemplary embodiment. Fire suppression system 10 includes a controller 100 and nozzles, sprayers, dispersion devices, electronically controlled variable flow rate nozzles, pulse width modulated (PWM) nozzles, etc., shown as variable flow nozzles 412. Variable flow nozzles 412 are configured to transition between an activated state and a deactivated state. When variable flow nozzles 412 are in the activated state, fire suppressant agent (FSA) that is provided to variable flow nozzles 412 is distributed, sprayed, spread, discharged, etc., to an area 51. Area 51 can be any space, area, surface, zone, etc., at which fire suppression system 10 is configured to suppress fire. Fire suppression system 10 can suppress, extinguish, and prevent additional growth of fire using any of the techniques, methods, functionality, processes, etc., described herein. While fire suppression system 10 generally include PWM nozzles 412, in other embodiments, any combination of PWM nozzles and non-PWM nozzles may be used.

It should be understood that while the nozzles of fire suppression system 10 are described as PWM nozzles herein, variable flow nozzles 412 can be any variable flow rate nozzle that is electronically controlled by controller 100. For example, variable flow nozzles 412 may be adjustable nozzles with a needle valve that is actuated by a stepper motor to achieve a desired flow rate (e.g., a discharge rate) of fire suppressant agent. In such a case, controller 100 generates and provides control signals to the nozzles 412 instead of PWM signals.

Fire suppression system 10 includes a delivery system 16 and a control system 12. Delivery system 16 includes a reservoir, a tank, a cartridge, a container, etc., shown as fire suppressant reservoir 14. Fire suppressant reservoir 14 can include an inner volume, an inner chamber, etc., configured to contain fire suppressant agent. Fire suppressant reservoir 14 may be pressurized or unpressurized. The fire suppressant agent can be any of foam (e.g., fluorinated or non-fluorinated foam such as foams having no fluorinated additives), water, wet chemical, etc., or any other liquid/fluid fire suppressant agent. Delivery system 16 can be fluidly coupled with variable flow nozzles 412 to provide the fire suppressant agent from fire suppressant reservoir 14 to variable flow nozzles 412. In some embodiments, fire suppressant reservoir 14 is fluidly coupled with variable flow nozzles 412 through conduit 18.

Delivery system 16 includes a pump, a suction pump, a discharge pump, a centrifugal pump, a pressure source, etc., shown as pump 20. Pump 20 is fluidly coupled with reservoir 14 through pipes, hoses, tubular members, etc., shown as conduits 18. Pump 20 is configured to receive the fire suppressant agent from reservoir 14 and drive the fire suppressant agent to variable flow nozzles 412 through pipes, conduits, connectors, etc., therebetween.

Delivery system 16 can include a pressure regulator, a flow regulator, etc., shown as regulator 28. Regulator 28 (and/or pump 20) can be operated by controller 100 and is configured to maintain a desired volumetric flow rate or pressure therethrough to meet discharge demands. In some embodiments, regulator 28 is fluidly coupled and in-line with conduit 18. Regulator 28 can be or include a flow regulator, a pressure regulator, combinations thereof, etc. Regulator 28 can be fluidly coupled with fire suppressant reservoir 14 through a return line, a return conduit, a tubular member, a hose, etc., shown as return line 19. It should be understood that regulator 28 and pump 20 may represent various components that are configured to provide pressure regulation. For example, regulator 28 and pump 20 may be provided as a conventional pump with a conventional pressure regulator, a conventional pump with an electronically controlled pressure regulator, a pulse width modulated pump, a pump with a variable speed frequency drive, etc.

Delivery system 16 can include a flow sensor 24. Flow sensor 24 is configured to measure or monitor a volumetric flow rate or a flow rate velocity through conduit 18. In some embodiments, flow sensor 24 provides measured or monitored values of the flow rate or the flow rate velocity to controller 100. Controller 100 can adjust an operation of regulator 28, pump 20, and/or variable flow nozzles 412 based on the measurements of flow sensor 24 and/or pressure sensor 26. In some embodiments, delivery system 16 includes a pressure sensor 26. Pressure sensor 26 is configured to measure any of static pressure or dynamic pressure (or both) of fire suppressant agent flowing through conduits 18. In some embodiments, pressure sensor 26 provides controller 100 with the measured static or dynamic pressure of delivery system 16. Controller 100 can receive the measured static or dynamic pressure of delivery system 16 and use the measurements to adjust an operation of regulator 28, pump 20, and/or variable flow nozzles 412.

Control system 12 can include sensors 414. Sensors 414 can include a temperature sensor 32, a light detector 34, and an infrared sensor 36, or any other optical or other sensor configured to monitor the presence of fire or obtain fire condition data (e.g., data that indicates a presence of a fire condition such as smoke, temperature, rise of temperature, optical detection, etc.). Temperature sensor 32 can be any of a fusible link, a thermocouple, a thermistor, etc., or any other sensor configured to measure temperature. Light detector 34 can be any sensor configured to measure light intensity. Likewise, infrared sensor 36 can be configured to measure or monitor emitted heat (e.g., radiative heat). In some embodiments, sensors 414 provide any of their measurements to controller 100. In some embodiments, controller 100 uses any of the sensor measurements to determine operation of variable flow nozzles 412. In some embodiments, delivery system 16 is activated by controller 100. In other embodiments, delivery system 16 is activated mechanically (e.g., by a fusible link). In both cases, the operation of variable flow nozzles 412 can be operated by controller 100 to provide appropriate fire suppression response.

Controller 100 can generate PWM signals or control signals and provide the PWM signals or control signals to any of variable flow nozzles 412 (e.g., if the variable flow nozzles 412 are PWM nozzles). In some embodiments, controller 100 generates a unique PWM signal or control signal for each of variable flow nozzles 412. In this way, controller 100 can operate variable flow nozzles 412 independently. In some embodiments, controller 100 operates all of variable flow nozzles 412 the same (e.g., uniformly). In some embodiments, controller 100 performs a predefined or pre-programmed fire suppression response in response to detecting a fire or in response to delivery system 16 activating. In some embodiments, controller 100 uses feedback control to operate variable flow nozzles 412. For example, controller 100 can monitor sensor information received from sensors 414 in real-time and operate variable flow nozzles 412 to provide fire suppressant agent based on the real-time sensor readings. In this way, controller 100 can operate variable flow nozzles 412 to extinguish or suppress a fire, and transition variable flow nozzles 412 into the de-activated state in response to detecting that the fire has been adequately suppressed or extinguished. Controller 100 can adjust an operation of variable flow nozzles 412 based on the sensor signals received from sensors 414. Controller 100 can also operate pump 20 to maintain a relatively constant flow rate through conduit 18. In some embodiments, controller 100 uses sensor information from flow sensor 24 and/or pressure sensor 26 to operate pump 20 to maintain a relatively constant flow rate.

Controller 100 can operate variable flow nozzles 412 to target and respond to fire conditions in a space or area. For example, controller 100 can use sensor feedback to identify an approximate location, intensity, size, and detection of fire and activate variable flow nozzles 412 at or near the approximate location of the fire to suppress the fire. In some embodiments, controller 100 stores corresponding locations of various appliances in the space and determines an appropriate fire suppression response to suppress the fire for particular appliances. Controller 100 can operate variable flow nozzles 412 to discharge fire suppressant agent at various discharge rates to suppress the fire. In some embodiments, controller 100 is configured to use sensor feedback to identify/detect reignition or spread of the fire. Controller 100 can operate variable flow nozzles 412 to re-activate to suppress reignitions of the fire. Controller 100 can also operate variable flow nozzles 412 to suppress the fire if the fire spreads (e.g., activate additional variable flow nozzles 412 to discharge fire suppressant agent to the fire).

Fire suppression system 10 can be configured for use with a restaurant area (e.g., a cooker, a fryer, etc., or any other kitchen appliance, device, zone, area, etc., where fire suppression is desired, a vehicle system/area, etc., or any other area, zone, system, device, equipment, etc., that uses or is served by a liquid fire suppressant agent. For example, fire suppression system 10 can be used as a sprinkler system for a building, room, etc., to provide fire suppression for the building or room.

Referring still to FIGS. 1 and 2, controller 100 can receive a program update from remote network 450. Remote network 450 can be a server, a remote device, etc., configured to wirelessly or wiredly communicate with controller 100. Remote network 450 can provide controller 100 with updated fire suppression response programs to account for changes in appliance locations, fryer locations, etc. For example, if fire suppression system 10 is configured to provide fire suppression for a kitchen, and a kitchen manager moves the location of various equipment, ovens, fryers, etc., remote network 450 can provide controller 100 with updated fire suppression response programs to account for the changed layout of the kitchen. In this way, the configurations and locations of variable flow nozzles 412 does not need to be adjusted. Rather, the fire suppression response program of controller 100 can be adjusted to account for changed layout and still provide fire suppression. This reduces the need to re-plumb or re-install a new fire suppression system for layout changes. Advantageously, fire suppression system 10 is a versatile fire suppression system that can be easily changed to serve or provide fire suppression for various layouts, without requiring structural changes to fire suppression system 10.

Variable flow nozzles 412 can provide fire suppressant agent to a corresponding zone, appliance, area, etc., of area 51 periodically or intermittently. In some embodiments, variable flow nozzles 412 transition between the activated state to provide fire suppressant agent to the corresponding zone, and the deactivated state such that fire suppressant agent is not provided to the corresponding zone. Variable flow nozzles 412 can be operated by controller 100 to transition back and forth between the activated state and the deactivated state to provide fire suppressant agent to the corresponding zone or area over a time duration to provide an average volumetric flow rate of fire suppressant agent to the corresponding zone.

Advantageously, using variable flow nozzles 412 or any other electronically controlled variable flow rate nozzle can reduce a need for piping restrictions. For example, other systems require certain sizes, lengths, etc., of various pipes or tubular members (e.g., conduit 18) of delivery system 16 in order to prevent the system from exceeding a maximum allowable pressure drop at each nozzle, which adversely affects the desired or minimum flow rate or premature loss of agent flow at particular nozzles due to oversized piping. Advantageously, the discharge rate of nozzles 412 is controlled, adjusted, set, etc., through operation of variable flow nozzles 412. Controlling the discharge rate at variable flow nozzles 412 allows conduits 18 to be oversized, which can eliminate concerns of maximum allowable pressure drops, and removes the restrictions of having particularly sized conduits to prevent premature loss of agent flow at particular nozzles due to oversized piping. For example, the various tubular members (e.g., conduit 18) may be configured or sized to provide a flow rate of fire suppressant agent that exceeds a required flow rate for fire suppression of a particular fire. However, the nozzles 412 can be operated to provide a flow rate that is lower than the flow rate that can be provided by the conduit 18.

Referring particularly to FIG. 2, each variable flow nozzle 412 includes an area, a space, a surface, a dispersion area, a spread area, etc., shown as discharge area 38. Discharge area 38 is the area over which the corresponding one of variable flow nozzles 412 provides or discharges fire suppressant agent. In some embodiments, discharge area 38 of all of variable flow nozzles 412 are the same (e.g., all of variable flow nozzles 412 are configured to discharge fire suppressant agent over an equal area), while in other embodiments, discharge area 38 of variable flow nozzles 412 differs (e.g., some of variable flow nozzles 412 have a larger discharge area 38, while others have a smaller discharge area 38). Variable flow nozzles 412 can be spaced apart such that discharge areas 38 overlap. For example, variable flow nozzles 412 can be spaced two feet apart with a discharge area 38 having a radius that may be approximately two feet, less than two feet, or greater than two feet according to various alternative embodiments. In some embodiments, variable flow nozzles 412 are located based on appliances in area 51. For example, more variable flow nozzles 412 may be located near one appliance or device, while less variable flow nozzles 412 are located near another appliance or device. The location of variable flow nozzles 412 can be tailored to provide fire suppressant agent based on the layout of the appliances, the shape of area 51, etc.

Area 51 can include multiple zones, areas, spaces, quadrants, etc., shown as areas 40. Area 51 can be sub-divided into various areas 40 based on variable flow nozzle 412 layout, appliance layout, space geometry, etc. In some embodiments, each area 40 includes a corresponding set of sensors 414. For example, a first area 40 may have a first set of sensors 414, while a second area 40 can have a second set of sensors 414. In this way, the presence of fire at any of areas 40 can be monitored. In some embodiments, controller 100 receives any of the sensor signals from sensors 414 to determine if a fire is present as well as an approximate location at which the fire is present (e.g., which of areas 40).

In some embodiments, a single one of variable flow nozzles 412 is configured to serve (e.g., provide fire suppressant agent thereto) a corresponding one of areas 40. In some embodiments, multiple variable flow nozzles 412 (e.g., two, three, four, five, etc.) are configured to serve or provide fire suppressant agent to a corresponding one of areas 40. In some embodiments, each variable flow nozzle 412 includes a corresponding set of sensors 414 such that fire proximate each variable flow nozzle 412 can be detected. In some embodiments, controller 100 stores locations of any of the one or more variable flow nozzles 412 that correspond to each of areas 40 as well as the set of sensors 414 that correspond to each of areas 40. In some embodiments, controller 100 can activate appropriate variable flow nozzles 412 to suppress a fire at any of areas 40. In some embodiments, individual areas 40 are served by multiple variable flow nozzles 412. Likewise, one of variable flow nozzles 412 can be configured to serve multiple zones. In other embodiments, areas 40 are defined as a space or area directly below a corresponding variable flow nozzle 412.

Controller 100 can provide PWM signals or control signals to any of variable flow nozzles 412 to provide a variable flow of fire suppressant agent, a variable discharge time duration, and to target the fire. In this way, controller 100 can suppress a fire at a specific location in area 51. Controller 100 can advantageously reduce the amount of fire suppressant agent used, and improve fire suppression of fire suppression system 10 by targeting the fire and intelligently operating variable flow nozzles 412 to suppress the fire. In some embodiments, controller 100 operates variable flow nozzles 412 to discharge fire suppression agent based on an intensity of the detected fire.

Figure 3:
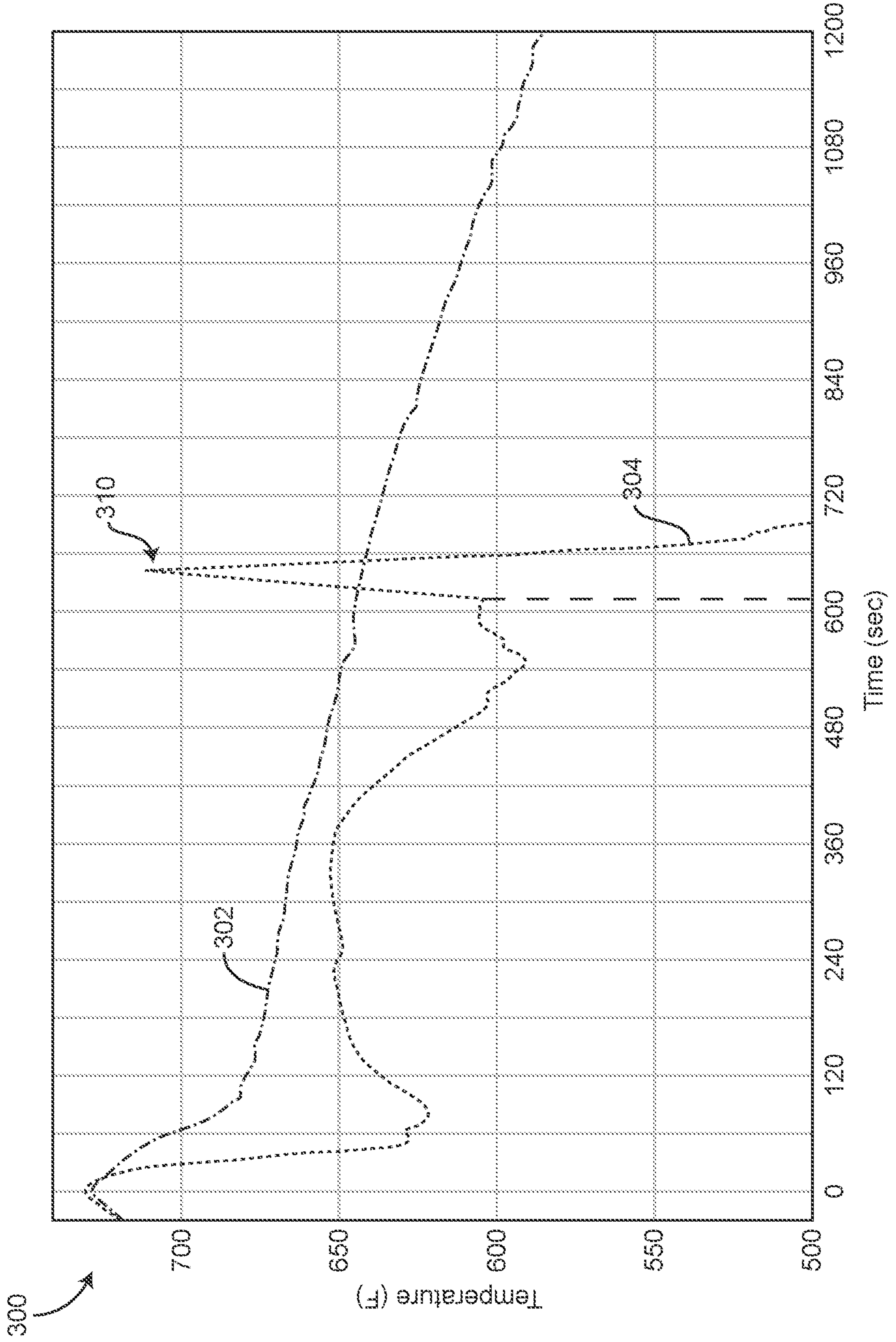
FIG. 3 is a graph of temperature over time for a single discharge rate application of fire suppressant agent, and a dual or variable discharge rate application of fire suppressant agent, according to an exemplary embodiment.

Referring now to FIG. 3, a graph 300 illustrating temperature (the Y-axis) over time (the X-axis) is shown, according to some embodiments. Graph 300 includes series 302 and series 304. Series 302 illustrates the temperature changes over time for a variable flow fire suppressant application. For example, fire suppressant agent can be discharged by any of variable flow nozzles 412 at a higher flow rate over an initial time duration, and then at a reduced flow rate over a second, longer, time duration (represented by series 302). Series 304 illustrates one example of when the fire suppressant agent is discharged at a higher, constant, flow rate. For example, as shown in graph 300, for the constant flow rate application (series 304), a reflash or reignition 310 is shown to occur at approximately 600 seconds, which can result in further spread of the fire and additional damage. However, for the variable flow rate application of fire suppressant agent (series 302), reflash/reignition does not occur and the temperature decreases at a more constant rate until the threat of reflash is eliminated. Advantageously, controller 100 can operate variable flow nozzles 412 to discharge fire suppressant agent at a first flow rate over a first time period, and then at a second, lower, flow rate over a second time period. In some embodiments, controller 100 operates variable flow nozzles 412 to discharge fire suppressant agent over more than two time periods with a corresponding flow rate for each of the time periods. This reduces the likelihood of reflash/reignition occurring, thereby improving the fire suppression ability of fire suppression system 10.

Figure 10:
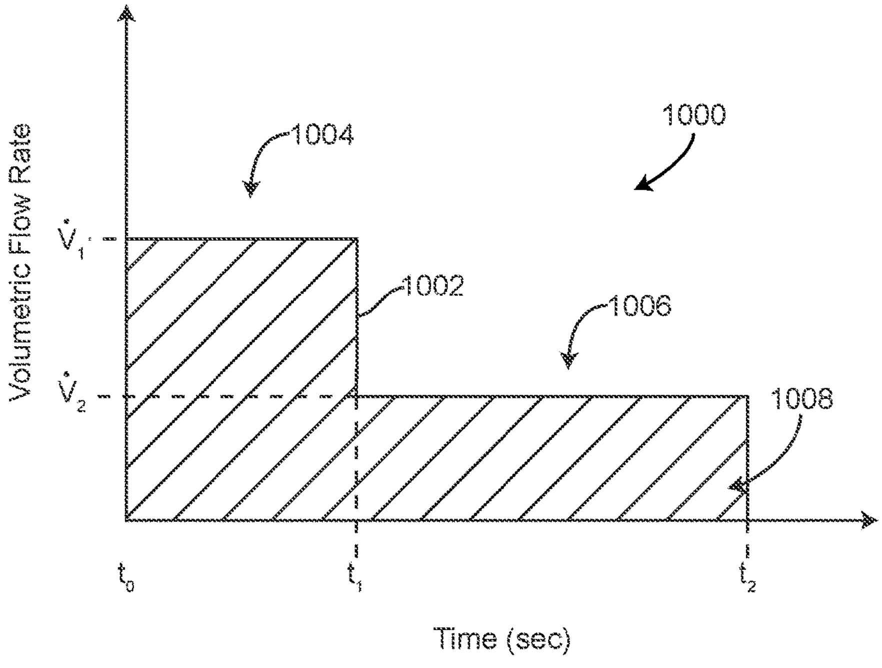
FIG. 10 is a graph of a dual flow application of fire suppressant agent, according to an exemplary embodiment.

Referring now to FIG. 10, a graph 1000 illustrating the dual flow application/discharge of fire suppressant agent is shown. Graph 1000 shows volumetric flow rate (i.e., discharge rate, the Y-axis) with respect to time (the X-axis). Graph 1000 includes series 1002. Series 1002 includes a first discharge time interval 1004 from time $t_0$ to $t_1$ and a second discharge time interval 1006 from time $t_1$ to time $t_2$. A total volume of fire suppressant agent provided over time $t_0$ to time $t_2$ is shown as area 1008 below series 1002. As shown, the volumetric flow rate or the discharge rate of first discharge time interval 1004 is $\dot{V}_1$ while the volumetric flow rate or the discharge rate of the second discharge time interval 1006 is $\dot{V}_2$, with $\dot{V}_2<\dot{V}_1$. Advantageously, the amount of fire suppressant agent discharged over the time interval from $t_0$ to $t_2$ is less than if the fire suppressant agent were discharged at a constant rate. Using the multiple discharge rate approach works on the basis that the fire is substantially suppressed within the first time interval. The second time interval has a reduced discharge rate to facilitate preventing flareups or reignitions. Advantageously, the dual or changing flow application of fire suppressant agent provides better fire suppression (as shown in FIG. 3), uses less fire suppressant agent and/or uses a comparable amount of fire suppressant agent that is provided over a longer time interval, thereby improving fire suppression. The ability to store more agent than what is required to suppress the fire combined with the ability to reactivate the system allows left over fire suppressant agent to be used in the event that a reflash does occur or in other areas where fire suppressant agent may be needed for fire suppression. Various flow rates at variable flow nozzles 412 are achieved by transitioning variable flow nozzles 412 (independently or in unison) between the activated and the deactivated state. In this way, an overall or average flow rate over time at variable flow nozzles 412 can be achieved.

The dual or changing flow application of fire suppressant agent can also facilitate a constant crust/blanket formation. For example, over the first time interval, the crust may be formed quickly, while over the second time interval (with the reduced discharge rate), the crust/blanket thickness is maintained. While over the second time interval (e.g., with a reduced discharge rate), the crust/blanket thickness is maintained with less agent spill-off or without the agent spilling off of the area that requires suppression. Preventing or reducing spill-off facilitates using less agent that is more effective than a discharge of excessive agent since spill-off may deplete the blanket or crust faster than it is renewed or formed as excess agent is applied. Advantageously, for oil fryer applications, providing the fire suppressant agent at dual or changing discharge rates facilitates using saponification to suppress the fire. The fire suppressant agent may saponificate and provide/form a blanket or covering over the oil. Providing the fire suppressant agent at the second, reduced, discharge rate facilitates maintaining a constant thickness of the blanket or covering, thereby preventing the fire from receiving oxygen and reducing the likelihood of flareups or reignitions. Controller 100 can operate variable flow nozzles 412 to provide fire suppressant agent to suppress the fire as shown in graph 1000. In some embodiments, an infinitely variable flow rate is tailored to meet the requirements to maintain fire suppression.

Controller

Overview

Figure 4:
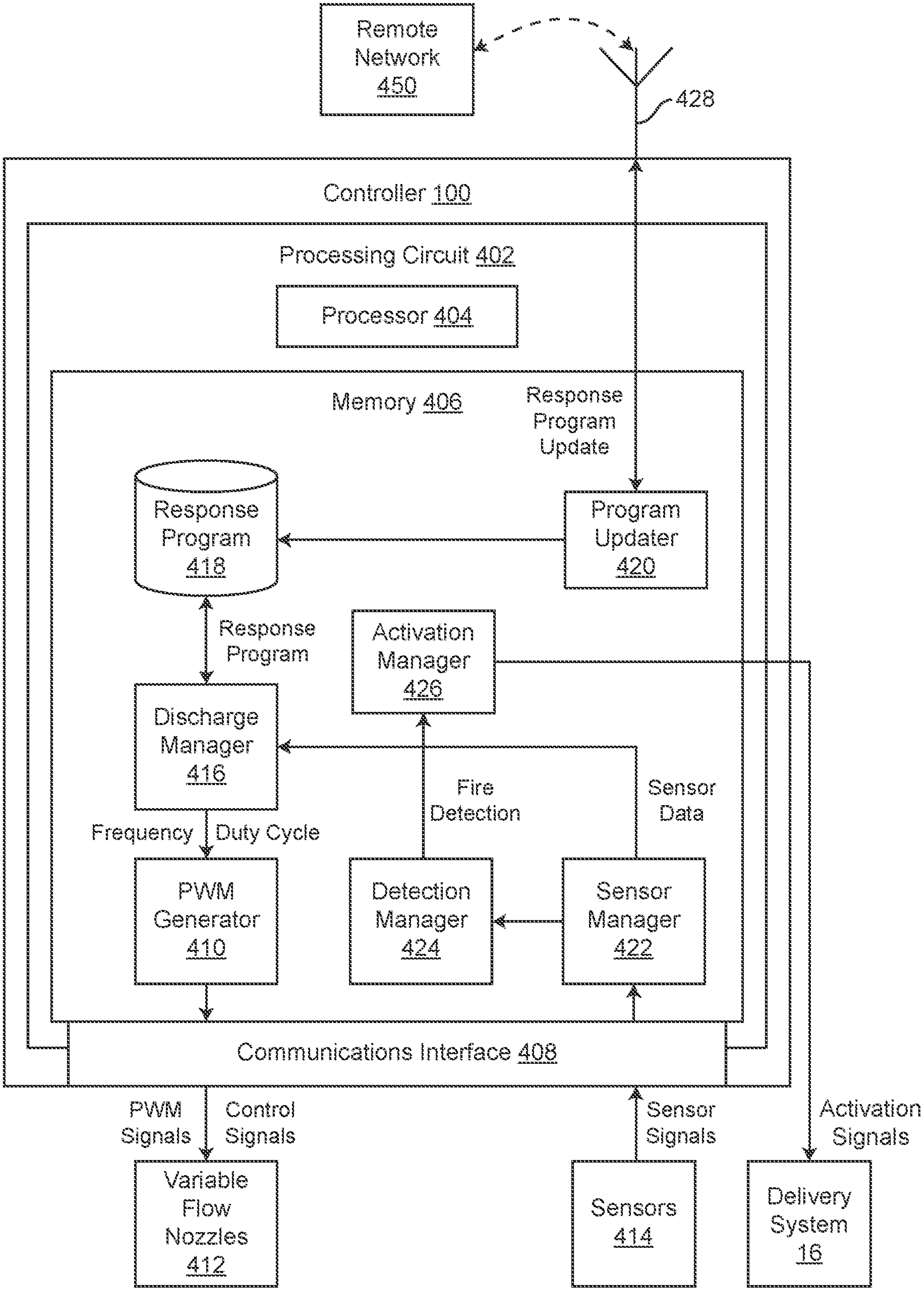
FIG. 4 is a block diagram of a controller configured to control the fire suppression system of FIG. 1, according to an exemplary embodiment.

Referring now to FIG. 4, controller 100 can include a communications interface 408. Communications interface 408 may facilitate communications between controller 100 and external systems, devices, sensors, etc. (e.g., variable flow nozzles 412, sensors 414, etc.) for allowing user control, monitoring, and adjustment to any of the communicably connected devices, sensors, systems, primary movers, etc. Communications interface 408 may also facilitate communications between controller 100 and a human machine interface. Communications interface 408 may facilitate communications between controller 100 and variable flow nozzles 412 and sensors 414.

Communications interface 408 can be or include wired or wireless communications interfaces (e.g., jacks, antennas, transmitters, receivers, transceivers, wire terminals, etc.) for conducting data communications with sensors, devices, systems, nozzles, etc., of control system 12 or other external systems or devices (e.g., a user interface, an engine control unit, etc.). In various embodiments, communications via communications interface 408 can be direct (e.g., local wired or wireless communications) or via a communications network (e.g., a WAN, the Internet, a cellular network, etc.). For example, communications interface 408 can include an Ethernet card and port for sending and receiving data via an Ethernet-based communications link or network. In another example, communications interface 408 can include a Wi-Fi transceiver for communicating via a wireless communications network. In some embodiments, the communications interface is or includes a power line communications interface. In other embodiments, the communications interface is or includes an Ethernet interface, a USB interface, a serial communications interface, a parallel communications interface, etc.

Controller 100 includes a processing circuit 402, a processor 404, and memory 406, according to some embodiments. Processing circuit 402 can be communicably connected to communications interface 408 such that processing circuit 402 and the various components thereof can send and receive data via the communications interface. Processor 404 can be implemented as a general purpose processor, an application specific integrated circuit (ASIC), one or more field programmable gate arrays (FPGAs), a group of processing components, or other suitable electronic processing components.

Memory 406 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 406 can be or include volatile memory or non-volatile memory. Memory 406 can include database components, object code components, script components, or any other type of information structure for supporting the various activities and information structures described in the present application. According to some embodiments, memory 406 is communicably connected to processor 404 via processing circuit 402 and includes computer code for executing (e.g., by processing circuit 402 and/or processor 404) one or more processes described herein.

Referring still to FIG. 4, memory 406 includes a pulse width modulation (PWM) generator 410, according to some embodiments. In some embodiments, PWM generator 410 is configured to generate PWM signals and provide the PWM signals to variable flow nozzles 412 to operate variable flow nozzles 412. Variable flow nozzles 412 may receive the PWM signals and transition between the activated and the deactivated state based on the received PWM signals.

PWM generator 410 is configured to generate PWM signals for each of the variable flow nozzles 412. In some embodiments, the PWM signals generated and provided to variable flow nozzles 412 are different for each of variable flow nozzles 412. In some embodiments, the PWM signals generated and provided to variable flow nozzles 412 are the same for each of variable flow nozzles 412. PWM generator 410 can receive an indication from discharge manager 416 regarding which of variable flow nozzles 412 should be activated, a desired flow rate for each of variable flow nozzles 412, etc. In some embodiments, PWM generator 410 also receives an indication of when variable flow nozzles 412 should be activated. For example, PWM generator 410 can receive a command from discharge manager 416 to activate several of variable flow nozzles 412 to discharge fire suppressant agent at a high flow rate over a first period of time, and then discharge fire suppressant agent at a lower flow rate over a second period of time. In some embodiments, PWM generator 410 receives a desired duty cycle, D and/or a desired frequency $f$, for each of variable flow nozzles 412 from discharge manager 416. The duty cycle D for each of variable flow nozzles 412 indicates the fraction of one period over which the signal is "active."

For example, PWM generator 410 can receive the desired duty cycle D and/or the desired frequency $f$ for each of ten variable flow nozzles 412. The desired duty cycle D and/or the desired frequency $f$ can be different for each nozzle. A duty cycle of 0% can indicate that a particular one of variable flow nozzles 412 should not be activated while a duty cycle of 100% can indicate that the particular variable flow nozzle 412 should be continuously activated.

PWM generator 410 receives the desired duty cycle D for each of variable flow nozzles 412 and/or a desired frequency $f$, generates the PWM signals for each of variable flow nozzles 412 and provides the PWM signals to the corresponding variable flow nozzles 412. In some embodiments, variable flow nozzles 412 are automatically in an open configuration or an activated state, while in other embodiments, variable flow nozzles 412 are automatically in a closed configuration or a de-activated state. If variable flow nozzles 412 are not PWM nozzles, PWM generator 410 and discharge manager 416 can be a control signal generator that is configured to generate control signals for the variable flow nozzles 412 based on the sensor data and the response program.

Referring still to FIG. 4, discharge manager 416 is configured to determine an appropriate response to suppress the fire, according to some embodiments. In some embodiments, discharge manager 416 retrieves an appropriate response from a response program database 418. Response program database 418 can include various pre-determined or pre-programed fire suppression response steps, fire suppression response profiles, fire suppression control schemes, processes, etc. For example, response program database 418 can include a particular response for a variety of fire conditions (e.g., if a fire is present in zone A, if a fire is present in zone B, if a fire is present in both zone A and B, etc.). Discharge manager 416 can retrieve the appropriate response based on sensory information, system activation status, appliance type, fire intensity, fire location, etc.

For example, discharge manager 416 can retrieve an appropriate response from response program database 418 based on an indication of whether or not fire suppression system 10 has been activated. For example, if fire suppression system 10 is activated (e.g., due to the presence of fire, the melting of a fusible link, etc.), discharge manager 416 can retrieve an appropriate response from response program database 418 and provide the response (e.g., the particular desired duty cycle and/or frequency for each variable flow nozzle 412) to PWM generator 410. PWM generator 410 can then use the desired response (e.g., the desired duty cycle and/or frequency for each variable flow nozzle 412) and generate PWM signals for variable flow nozzles 412.

Discharge manager 416 can also receive sensor data from sensor manager 422. Sensor manager 422 is configured to receive sensor signals from any sensors 414. Sensors 414 can include thermistors, thermocouples, infrared detectors, light detectors, heat detectors, temperature sensors, etc., or any other sensor or collection of sensors configured to measure or monitor the presence of a fire. In some embodiments, each of variable flow nozzles 412 include a corresponding sensor or collection of sensors. In some embodiments, each device, appliance, cooker, fryer, etc., that fire suppression system 10 is configured to suppress fires thereof includes a sensor or a collection of sensors 414. In some embodiments, each area 40 includes a sensor or a collection of sensors 414. For example, a first fryer can include a first sensor or collection of sensors 414, a second fryer can include a second sensor or collection of sensors 414, etc. In this way, the presence of fire at each appliance, zone, area, device, etc., can be monitored.

Sensor manager 422 is configured to receive sensor signals from sensors 414 and provide sensor data (e.g., fire condition data) to any of detection manager 424 and discharge manager 416. In some embodiments, sensor manager 422 receives the sensor signals from sensors 414 (e.g., in a voltage) and converts the sensor signals to a value (e.g., to a temperature value, a light intensity value, a heat value, etc.). In some embodiments, sensor manager 422 identifies a corresponding zone, device, appliance, etc., for each of the sensor signals received from sensors 414. In this way, sensor manager 422 can provide detection manager 424 and/or discharge manager 416 with a value of each of sensors 414 as well as an identified zone, location, appliance, etc. For example, sensor manager 422 can provide detection manager 424 and/or discharge manager 416 with sensor information from each of areas 40. Detection manager 424 can use the sensor information for each of areas 40 to determine if a fire or a fire condition is present at any areas 40. In some embodiments, detection manager 424 is configured to provide discharge manager 416 with an indication regarding fire detection at each of the zones. For example, if area 51 includes five zones, detection manager 424 can provide discharge manager 416 with fire detection information for each of the five zones.

Detection manager 424 can receive any of the sensor data/information from sensor manager 422 in real time and perform a fire detection algorithm. Detection manager 424 can determine a vector of binary values for each of areas 40 indicating whether or not a fire or a fire condition is present in areas 40. If area 51 includes five areas 40, detection manager 424 can output a vector $FD=[fd_1\ fd_2\ fd_3\ fd_4\ fd_5]$, where $fd_i$ is a binary value of an ith zone, indicating whether or not a fire is detected in the ith zone. For example, if detection manager 424 determines that a fire is present in a $3^{rd}$ zone (e.g., a particular one of areas 40), the vector FD may have the form FD=[0 0 1 0 0].

In some embodiments, detection manager 424 merely provides discharge manager 416 with an indication of whether a fire is detected anywhere in area 51. For example, detection manager 424 can output a binary variable $fd$ to discharge manager 416, where $fd$ is either 1 (i.e., indicating that a fire is present in area 51) or 0 (i.e., indicating that a fire is not present in are 50). In some embodiments, the binary variable $fd$ is determined by detection manager 424 using the fire detection algorithm based on sensor data received from sensor manager 422. In some embodiments, the binary variable $fd$ is an indication regarding whether or not fire suppression system 10 has been activated. For example, if fire suppression system 10 is configured to activate mechanically (e.g., in response to a fusible link melting), the binary variable $fd$ can indicate whether or not fire suppression system 10 has activated (e.g., whether or not the fusible link has melted).

Detection manager 424 can also determine a severity or intensity of the fire, according to some embodiments. In some embodiments, detection manager 424 determines a severity of the fire based on any of the temperature sensor data, light intensity sensor data, infrared sensor data, heat sensor data, etc. In some embodiments, detection manager 424 determines a weighted average based on any of the sensor data to determine a severity of the detected fire. In some embodiments, detection manager 424 is configured to use a model to predict a severity or intensity of the fire based on any of the sensor information. The model can be generated by detection manager 424 using a neural network, machine learning, a regression, etc., or any other model generating techniques. In some embodiments, detection manager 424 can output a separate vector of values of that indicate severity/intensity of the fire in the various areas 40. For example, detection manager 424 can output a vector FS with values for each of areas 40 indicating a severity of fire at each of areas 40. In some embodiments, the vector FS is the same size/length as the vector FD. In some embodiments, the vector FS is used to both indicate whether or not a fire is present in any of areas 40, as well as an intensity of fire at areas 40.

Discharge manager 416 can receive the fire detection data or vector from detection manager 424. In some embodiments, discharge manager 416 uses the fire detection data or vector(s) to retrieve a process, a model, an equation, a table, a graph, etc., from response program database 418. Response program database 418 can store a variety of fire suppression response programs or processes that discharge manager 416 uses to operate variable flow nozzles 412 to suppress the fire. Discharge manager 416 can determine appropriate flow rates for each of all of variable flow nozzles 412 based on the retrieved response program and send PWM generator 410 a current duty cycle value for each of variable flow nozzles 412. In some embodiments, the duty cycle value of one or more of variable flow nozzles 412 changes over time. For example, discharge manager 416 can provide PWM generator 410 with a high duty cycle for variable flow nozzles 412 over a first time period, and a lower duty cycle for variable flow nozzles 412 over a second time period. PWM generator 410 receives the duty cycle values from discharge manager 416, generates PWM signals according to the received duty cycle values and provides the PWM signals to variable flow nozzles 412 to operate variable flow nozzles 412 according to the response program.

The fire detection and suppression components disclosed herein can cooperate to suppress fires in a variety of manners. For example, mechanical and/or electrical detection and activation may be used to detect fires and activate the fire suppression system. In some embodiments, detecting a fire in one or more of a number of zones or areas results in activation of nozzles in all of the areas, regardless of whether a fire is detected in each area. In other embodiments, detecting a fire in one or more of a number of zones or areas results in selective activation of less than all of the nozzles in the areas based on factors such as location, intensity, temperature, rate of change of temperature, etc., of the fire. Further, the fire suppression system may utilize predetermined control schemes (e.g., that provide predetermined nozzle flow rates based on a particular location, appliance, etc.), and/or may use control schemes that vary nozzle flow rates in real time based on feedback from one or more sensors. Nozzle flow rates are controlled by way of the PWM signals sent to the various nozzles. Details of certain example, non-limiting embodiments are discussed in further detail below.

Control System with Mechanical Activation

Referring still to FIG. 4, controller 100 can be implemented with a mechanically activated fire suppression system 10. In some embodiments, fire suppression system 10 is configured to activate in response to a fusible link melting, a glass bulb breaking, etc. Controller 100 can monitor any properties (e.g., flow rate through delivery system 16, pressure in delivery system 16, a voltage associated with the fusible link or the glass bulb, a current associated with the fusible link or the glass bulb, etc.) to identify if fire suppression system 10 is activated. Some systems proceed to dump the entirety of fire suppression agent stored in reservoir 14 over a brief time period in response to mechanical activation.

Controller 100 can be used to adjust the flow rate and/or the discharge time over which fire suppressant agent is provided to suppress the fire. In some embodiments, sensor manager 422 is configured to measure a current, a voltage, a flow rate, a pressure, etc., that indicates whether fire suppression system 10 has been mechanically activated. Sensor manager 422 can provide detection manager 424 with any of the measured values in real-time. In some embodiments, detection manager 424 is configured to monitor and analyze the measured values to determine if fire suppression system 10 has been mechanically activated. For example, detection manager 424 and/or discharge manager 416 can be configured to compare a current or a voltage value to a threshold value and if the current or voltage exceeds or decreases below the threshold value, discharge manager and/or detection manager 424 can determine that fire suppression system 10 has been activated mechanically.

Discharge manager 416 can retrieve an appropriate response program from response program database 418 in response to fire suppression delivery system 10 activating mechanically. In some embodiments, the response retrieved from response program database 418 includes multiple discharge time durations, and corresponding flow rates of the fire suppression agent for each of the multiple discharge time durations. In some embodiments, the response retrieved from response program database 418 includes a first time duration $\Delta t_1$ and a second time duration $\Delta t_t$, as well as corresponding volumetric flow rates $\dot{V}_1$ and $\dot{V}_2$ for the first and second discharge time durations. In some embodiments, discharge manager 416 uses the first and second time durations $\Delta t_1$ and $\Delta t_2$ as well as the corresponding volumetric flow rates (e.g., discharge rates of the fire suppressant agent) to determine duty cycles for variable flow nozzles 412 to achieve the first and second volumetric flow rates over the first and second discharge times. Discharge manager 416 can provide PWM generator 410 with a first duty cycle value $D_1$ over the first time duration $\Delta t_1$ such that PWM generator 410 generates a first PWM signal and provides the first PWM signal to variable flow nozzles 412. Discharge manager 416 can continue providing PWM generator 410 with the first duty cycle value $D_1$ over the first discharge time duration $\Delta t_1$.

After the first discharge time duration $\Delta t_1$ is completed, discharge manager 416 can then provide PWM generator 410 with a second duty cycle value $D_2$ over the second time duration $\Delta t_2$ such that PWM generator 410 generates a second PWM signal that operates variable flow nozzles 412 to discharge fire suppression agent at the second volumetric flow rate $\dot{V}_2$. In some embodiments, PWM generator 410 provides the same PWM signal to variable flow nozzles 412 such that all of variable flow nozzles 412 discharge fire suppressant agent at the same volumetric flow rate. In some embodiments, the second volumetric flow rate $\dot{V}_2$ is less then the first volumetric flow rate $\dot{V}_1$. In this way, controller 100 can operate variable flow nozzles 412 in a mechanically activated system to provide the fire suppressant agent at a first volumetric flow rate over a first time period, and at a second, lower, volumetric flow rate over a second time period.

It should be noted that while the example above explains only two time durations with two volumetric flow rates, any number of discharge time durations and corresponding flow rates (e.g., discharge rates) can be used. In some embodiments, for example, three discharge time durations, $\Delta t_1$, $\Delta t_2$, and $\Delta t_3$ are retrieved by discharge manager 416 from response program database 418 in addition to three discharge rates $\dot{V}_2$, and $\dot{V}_3$. In some embodiments, the three discharge rates are descending over time (i.e., $\dot{V}_1>\dot{V}_2>\dot{V}_3$). In other embodiments, the three discharge rates ascend over time (i.e., $\dot{V}_1<\dot{V}_2<\dot{V}_3$). In other embodiments, the discharge rates ascend and then descend, or vice versa (i.e., $\dot{V}_1>\dot{V}_2<\dot{V}_3$ or $\dot{V}_1<\dot{V}_2>\dot{V}_3$).

In some embodiments, the discharge rate retrieved by discharge manager 416 is substantially constant over a corresponding discharge time duration/time period. In other embodiments, the discharge rate changes over the time duration/time period. For example, the discharge rate can decrease or increase linearly with time, non-linearly with time, etc. In some embodiments, discharge manager 416 retrieves a function of discharge rate from response program database 418. For example, the function can have the form:

$$\dot{V}=f(t)$$

where $\dot{V}$ is the discharge rate that variable flow nozzles 412 are to be operated at, t is time (e.g., a current time, with t=0 being when fire suppression system 10 is first activated), and $f$ is a function that relates $\dot{V}$ to t. In some embodiments, $f$ is a linear function (e.g., either increasing or decreasing) such as:

$$\dot{V}=mt+\dot{V}_{initial}$$

where $\dot{V}_{initial}$ is an initial discharge rate (at t=0), m is a constant, and t is time. In other embodiments, $f$ is a polynomial function, an exponential function (e.g., an exponentially decaying function), a square function (e.g., a stepped function), a sinusoidally increasing or decreasing function, or any other non-linear function. In some embodiments, discharge manager 416 uses a stored relationship that relates the discharge rate $\dot{V}$ to a duty cycle required to achieve the discharge rate $\dot{V}$ over a time period. For example, the discharge rate can be an average discharge rate over a time period, and variable flow nozzles 412 can be transitioned between the activated and the deactivated state to provide the fire suppressant agent to area 51 at the discharge rate $\dot{V}$.

For example, discharge manager 416 can use a relationship:

$$D=f_{duty}(\dot{V})$$

where D is the duty cycle provided to PWM generator 410, $\dot{V}$ is the desired discharge rate, and $f_{duty}$ is a function or equation that relates $\dot{V}$ to D. In some embodiments, discharge manager 416 uses the above relationship or a similar relationship to generate a duty cycle value that achieves the desired discharge rate. In some embodiments, $f_{duty}$ is an empirically generated model or a model determined based on properties, geometry, reservoir pressure, etc., or any other known properties of fire suppression system 10.

In some embodiments, discharge manager 416 determines an on time or an off time for variable flow nozzles 412 over a time period. In some embodiments, discharge manager 416 retrieves duty cycle values from response program database 418 instead of or in addition to desired discharge rates. For example, discharge manager 416 can receive various duty cycle values and discharge time periods from response program database 418. Discharge manager 416 can provide the duty cycle value over the various discharge time period to PWM generator 410 such that PWM generator 410 provides PWM signals to variable flow nozzles 412 to discharge the fire suppressant agent at appropriate discharge rates.

In this way, controller 100 can be used with a mechanically activated fire suppression system. Advantageously, controller 100 can be used to provide a variable discharge rate or a variable discharge time duration to improve fire suppression-ability of fire suppression system 10. In some embodiments, using a variable or changing flow facilitates extinguishing or suppressing the fire in area 51 with a reduced amount of fire suppressant agent. In this way, controller 100 can be implemented in a mechanically activated fire suppression system and reduce fire suppressant usage quantity.

Control System with Sensor Activation

Referring still to FIG. 4, controller 100 can be used in an electronically activated fire suppression system, according to some embodiments. For example, controller 100 can be used to detect the presence of a fire in area 51 or in any of areas 40 and activate fire suppression system 10 in response to detecting a fire. In some embodiments, controller 100 can be configured to perform any of the functionality as described in greater detail above (e.g., to provide a changing or variable discharge of fire suppressant agent).

Controller 100 can receive and monitor any of temperature, heat, light intensity, etc., from any of sensors 414. In some embodiments, sensor manager 422 receives the sensor signals from sensors 414 via communications interface 408 and provides sensor values to detection manager 424. Detection manager 424 is configured to monitor and analyze the sensor data to determine if a fire is present in area 51.

In some embodiments, detection manager 424 is configured to generate a model that predicts a presence of fire in area 51. Detection manager 424 can use any neural network or machine learning algorithm (e.g., a convolutional machine learning technique, a radial basis function network, a modular neural network, a recurrent neural network, a Bayesian neural network, etc.) to generate/construct a model. In some embodiments, detection manager 424 is configured to use a predetermined model or function to determine if a fire is present in any of areas 40.

Detection manager 424 can receive and sort the sensor data by zone 40. Detection manager 424 can perform a fire detection algorithm based on the sensor data received from each of zones 40 to determine if a fire is present in any of the areas 40. In some embodiments, for example, detection manager 424 compares any of the temperature, the light intensity, the heat intensity, etc., measured by sensors 414 at each of areas 40 to a threshold value. For example, detection manager 424 can receive a temperature value $T_1$ from an area 40, and compare the temperature value $T_1$ to a temperature threshold value $T_{threshold}$. In some embodiments, if the temperature value $T_1$ exceeds the temperature threshold value $T_{threshold}$, detection manager 424 determines that a fire is present in the corresponding area 40. Detection manager 424 can perform a similar process for any ith area 40 (i.e., compare $T_i$ to $T_{threshold}$) to determine if a fire in present in the ith area 40. In some embodiments, detection manager 424 performs a similar process based on light intensity and heat intensity.

Similarly, detection manager 424 can compare any of the light intensity, the value measured by infrared sensor 36, to corresponding/associated threshold values to determine if a fire is present in any of areas 40. In some embodiments, detection manager 424 uses multiple areas 40 to detect if a fire is present in an ith zone. For example, detection manager 424 can analyze temperature values, heat disturbances, light intensity, etc., or any other sensor values of surrounding areas/zones to determine if a fire is present in a particular zone.

Detection manager 424 can also use a machine learning generated model to differentiate between temperature, heat, light intensity, etc., disturbances that may result from typical activities in area 51. Detection manager 424 can be provided with training data (e.g., sensor data that results from a real fire and sensor data that results from other typical activities) and can perform a machine learning technique such that a model that can be used to predict a real fire versus typical activities is generated. Detection manager 424 can use any of the machine learning techniques described in greater detail hereinabove. In some embodiments, detection manager 424 inputs actual/current sensor data from any of areas 40 to the generated model to determine if a fire is present in any of areas 40.

Detection manager 424 can also monitor temperature, light intensity, and heat intensity over time. In some embodiments, detection manager 424 is configured to determine a time rate of change of any of the measured temperature, light intensity, and heat intensity. For example, detection manager 424 can monitor any of the sensor data over a time interval (e.g., 1 second), and calculate $\dot{T}_i$ or a time rate of change of any of the other sensor data received from sensor manager 422 for each of areas 40. In some embodiments, detection manager 424 compares any of the time rate of change values to a threshold value to determine if a fire is present in any of areas 40. For example, detection manager 424 can compare the time rate of change of the temperature value of an ith area 40, $\dot{T}_i$, to a threshold rate of change value $\dot{T}_{threshold}$ to determine if a fire is present in the ith area/zone. In some embodiments, detection manager 424 determines that a fire is present in the ith area/zone in response to one or more of the rate of change values (e.g., $\dot{T}_i$) exceeding the threshold rate of change value (e.g., $\dot{T}_{threshold}$) for a predetermined amount of time.

In some embodiments, detection manager 424 uses multiple threshold values and/or multiple time rate of change threshold values to predict a likelihood that a fire is present in the ith area/zone of area 51. For example, detection manager 424 may determine that a fire is likely not present if the temperature $T_1$ in a first zone/area is below a first threshold value $T_{threshold,1}$, or if a time rate of change of the temperature $T_1$ is less than a corresponding time rate of change threshold value $\dot{T}_{threshold,1}$. Likewise, detection manager 424 can determine that a fire is likely present in the first zone if the temperature $T_1$ is above the first threshold value $T_{threshold,1}$. Likewise, if the temperature $T_1$ is above a second threshold value $T_{threshold,2}$, detection manager 424 can determine that a fire is very likely present in the first area. Detection manager 424 can use any number of threshold values, with consecutive threshold values being greater than preceding threshold values. In some embodiments, detection manager 424 uses a similar technique with multiple threshold values for the time rate of change (e.g., $\dot{T}_{threshold,1}$, $\dot{T}_{threshold,2}$, $\dot{T}_{threshold,3}$, etc.)

In some embodiments, detection manager 424 provides discharge manager 416 with the fire detection data for each of the zones (e.g., for each of areas 40). In some embodiments, detection manager 424 provides discharge manager 416 with the binary vector FD that indicates the presence of fire in areas 40. In some embodiments, detection manager 424 provides discharge manager 416 with a prediction of the likelihood of fire presence in all of areas 40.

Discharge manager 416 can store an approximate location of each of areas 40. In this way, if detection manager 424 provides discharge manager 416 with an indication that a fire is present in the fifth zone, discharge manager 416 can determine an approximate location of the fire. Discharge manager 416 can store a mapping of each of areas 40 and a corresponding location. The location can identify where areas 40 are in relation to each other, in relation to a coordinate system, in relation to variable flow nozzles 412, with respect to building floorplan, etc. In some embodiments, discharge manager 416 uses the identified location of the fire to operate corresponding or nearby variable flow nozzles 412 to target the fire. For example, if detection manager 424 determines that a fire is present in the fifth zone (e.g., $z_5$), discharge manager 416 can activate variable flow nozzles 412 associated with or near the fifth zone to suppress the fire. For example, if zones $z_2$, $z_3$, and $z_4$ are adjacent the fifth zone $z_5$, discharge manager 416 can operate variable flow nozzles 412 in zones $z_2$, $z_3$, $z_4$, and $z_5$ to suppress the fire in zone $z_5$. However, variable flow nozzles 412 in a distant zone (e.g., zone $z_{10}$) may remain deactivated. In some embodiments, discharge manager 416 stores an approximate location of the various sets of sensors 414. In this way, discharge manager 416 can identify an approximate location of the detected fire. Advantageously, targeting the fire by activating nearby variable flow nozzles 412 facilitates allowing activities to be resumed in area 51 (e.g., a kitchen) in unaffected areas. For example, variable flow nozzles 412 can activate near the detected fire to suppress the fire, without collateral damage to other parts of area 51 where a fire is not detected. This also reduces a cleanup zone.

Advantageously, targeting the fire and activating particular variable flow nozzles 412 to suppress the fire facilitates a more efficient use of the fire suppressant agent. The fire suppressant agent may be only partially discharged when targeting the fire, thereby reducing the need to entirely recharge fire suppression system 10 with new fire suppressant agent. Targeting the fire and activating nearby variable flow nozzles 412 reduces an amount of fire suppressant agent used to suppress the fire.

In some embodiments, discharge manager 416 is configured to determine which variable flow nozzles 412 to activate or provide fire suppressant agent through based on an intensity of the detected fire. For example, if a small fire is detected in zone $z_2$, discharge manager 416 may activate only the variable flow nozzles 412 in zone $z_2$. However, if a larger or more intense fire is detected in zone $z_2$, discharge manager 416 can activate variable flow nozzles 412 in zone $z_2$ as well as variable flow nozzles 412 in neighboring, adjacent, or nearby zones. Discharge manager 416 can use the location of the detected fire to determine which variable flow nozzles 412 should be activated. In some embodiments, discharge manager 416 activates all variable flow nozzles 412 within a radius of the location of the fire. The radius can be determined by discharge manager 416 based on fire intensity.

Discharge manager 416 can use any of the techniques described in greater detail above to provide variable discharge or variable discharge time to the identified fire. It should be understood that any of the techniques, functionality, processes, methods, etc., described herein that controller 100 can perform to identify/estimate an approximate location of the fire can also be used in a mechanically activated system. In some embodiments, any of the techniques, functionality, processes, methods, etc., described in greater detail above that controller 100 can use in a mechanically activated system can also be used in an electronically activated system.

Controller 100 is also configured to activate fire suppression system 10 in response to detecting a fire. In some embodiments, detection manager 424 provides any of the fire detection to activation manager 426. Activation manager 426 is configured to generate activation signals in response to receiving an indication from detection manager 424 that a fire is present in area 51. In some embodiments, activation manager 426 provides the activation signals to delivery system 16. Activation manager 426 can provide the activation signals to a valve, pump 20, an actuator, etc., to activate fire suppression system 10. In some embodiments, in an electronically activated fire suppression system, the fire suppressant agent is already pressurized and provided to variable flow nozzles 412. In some embodiments, transitioning variable flow nozzles 412 between the deactivated and the activated state (e.g., as operated by PWM generator 410) activates fire suppression system 10.

Control System with Active Response

Referring still to FIG. 4, controller 100 can be configured to actively respond to various conditions of area 51 to suppress the fire. In some embodiments, discharge manager 416 receives any of the senor data from sensor manager 422. Discharge manager 416 can use real time sensor data as feedback to operate variable flow nozzles 412 such that any of the sensor data is driven to an acceptable range or towards an acceptable value. For example, discharge manager 416 can receive real time temperature values of any or all of the areas 40 and operate variable flow nozzles 412 until the temperature of one or more or all of areas 40 is within an acceptable range or at an acceptable value. In some embodiments, discharge manager 416 is configured to use an application specific program to discharge fire suppressant agent.

For example, discharge manager 416 can store information regarding various appliances, devices, systems, etc., that are positioned about area 51. In some embodiments, discharge manager 416 retrieves various fire suppression profiles from response program database 418 based on the various appliances, devices, systems, etc., that are positioned about area 51. For example, if detection manager 424 provides discharge manager 416 with an indication that a fire is present in the $3^{rd}$ zone, discharge manager 416 can use a stored table, a chart, a graph, a mapping, a database, etc., to determine the type of appliance that is present in the $3^{rd}$ zone. Discharge manager 416 can then retrieve an appropriate fire suppression response profile from response program database 418 for the specific type of appliance. For example, the fire suppression response for a data center or a computer may be very different than the fire suppression response for an oil fryer or a stove top. The fire suppression response profiles can include any of discharge time durations, discharge rate for the various discharge time durations, etc. In some embodiments, the fire suppression response profiles are models that discharge manager 416 uses to determine any of a number of discharge time durations/intervals, a length of discharge time durations/intervals, discharge rate for the various discharge time durations/intervals, etc. In some embodiments, the models include fire intensity as an input. For example, discharge manager 416 can retrieve a fire suppression response profile for a fryer and input various sensor data to the model to determine an appropriate response for current conditions.

In some embodiments, the fire suppression response profiles include a function, an equation, etc., to provide non-constant discharge of fire suppressant agent. For example, the fire suppression profile for a fryer may be a dual-stage application of fire suppressant agent (e.g., fire suppressant agent is provided over a first time interval at a first discharge rate and over a second time interval at a second discharge rate), while the fire suppression profile for a stovetop may be a linearly decreasing or linearly increasing discharge rate.

In some embodiments, the fire suppression response profiles are models and discharge manager 416 inputs current fire conditions (e.g., sensor data such as current temperature, current light intensity, fire intensity, etc.) to the models. In general, the fire suppression response profiles can be either feedback control schemes that are appliance specific and use real time sensor data to actively respond to the fire, or can be a set of fire suppression steps (e.g., discharge time durations and corresponding discharge rates) that are performed without accounting for real time sensor data. In some embodiments, discharge manager 416 retrieves fire suppression response profiles that are feedback control schemes for certain types of appliances, and fire suppression response profiles that are a set of fire suppression steps for other types of appliances.

Discharge manager 416 uses the fire suppression response profiles, as well as the identified/determined location of the fire to activate appropriate variable flow nozzles 412. In some embodiments, discharge manager 416 and PWM generator 410 operates appropriate variable flow nozzles 412 (e.g., variable flow nozzles 412 in a specific zone where a fire is detected, and/or variable flow nozzles 412 that surround a specific zone where a fire is detected) according to the fire suppression response profile for the type of appliance present in the specific zone. Discharge manager 416 can use any of the relationships described herein to determine duty cycle values that achieve the desired discharge rate of fire suppressant agent. In some embodiments, discharge manager 416 provides the duty cycle values to PWM generator 410. PWM generator 410 can then use the duty cycle values to generate PWM signals and provide the PWM signals to certain variable flow nozzles 412 (as determined by discharge manager 416 based on the approximate location of the detected fire) such that variable flow nozzles 412 operate according to the fire suppression response profile.

It should be understood that discharge manager 416 can retrieve multiple fire suppression response profiles from response program database 418 at once and use the multiple fire suppression profiles concurrently. For example, if a fire is present in both zone $z_1$ and zone $z_4$, and a first type of appliance is in zone $z_1$ and a second type of appliance is in zone $z_4$, discharge manager 416 can retrieve fire suppression response profiles for the first and the second type of appliance. Discharge manager 416 and PWM generator 410 can use both the fire suppression response profiles concurrently to operate appropriate various variable flow nozzles 412 to suppress or extinguish the fire in both zone $z_1$ and zone $z_4$ concurrently.

Program Updating

Referring still to FIG. 4, controller 100 is configured to communicate with a remote network 450. In some embodiments, remote network 450 is configured to communicate with controller 100 wirelessly via a cellular dongle, a wireless transceiver, a wireless radio, etc., shown as wireless transceiver 428. In some embodiments, controller 100 can communicate with remote network 450 via a wired connection (e.g., an Ethernet connection, the Internet, a USB connection, etc.). In some embodiments, a technician can locally connect with controller 100. For example, the technician can connect with controller 100 via a data port of communications interface 408. The technician can then update controller 100 similar to how remote network 450 can update controller 100. In this way, a technician can also locally update various fire suppression response profiles or control schemes of controller 100.

Remote network 450 can be configured to provide program updates to program updater 420. Program updater 420 is configured to receive the program updates from remote network 450 and update any of the fire suppression response profiles stored in response program database 418. For example, if a manufacturer determines that a particular fire suppression response profile suppresses fire better for a specific type of appliance, the manufacturer can update that particular fire suppression response profile for the specific type of appliance in response program database 418. In this way, improvements to fire suppression response profiles or fire suppression programs can be remotely updated on controller 100 such that fire suppression system 10 remains up to date and uses the most efficient fire suppression response profiles.

In some embodiments, program updater 420 is also configured to update the mapping of area 51. For example, discharge manager 416 and/or response program database 418 can store a mapping of the various areas 40 and types of appliances or devices that are located in areas 40. If a building manager desires to change the location or layout of the appliances or devices, the building manager can notify the manufacturer or the contractor. The contractor can then update the mapping stored in response program database 418 and/or in discharge manager 416 by sending a command to controller 100 to update the mapping. If the building manager decides to switch appliance A in zone $z_1$ with appliance B in zone $z_3$, the manufacturer or building manager or contractor can remotely connect with controller 100 (e.g., via wireless transceiver 428) and send an update to program updater 420. Program updater 420 can then update the mapping in response program database 418 and/or discharge manager 416 such that the stored locations of appliance A and appliance B are switched. Program updater 420 can update, overwrite, etc., the current mapping with an updated version of the mapping that accounts for layout changes.

Advantageously, this facilitates allowing layout changes (e.g., moving appliances, removing old appliances, installing new appliances, etc.) without requiring fire suppression system 10 to be re-plumbed, physically updated, etc. Other fire suppression systems require plumping components, nozzles, etc., to be removed and physically changed when layout is changed, since such fire suppression systems tailor the infrastructure of the fire suppression system to the layout. However, fire suppression system 10 does not require such an infrastructure change. Rather, the location mapping of the various appliances in area 51 can be updated wirelessly. Controller 100 can then use the updated mapping of appliance locations for fire suppression. This removes the need to remove, replace, etc., structural components of fire suppression system 10, thereby decreasing renovation costs, and providing a more flexible fire suppression system.

Nozzle

Figure 11:
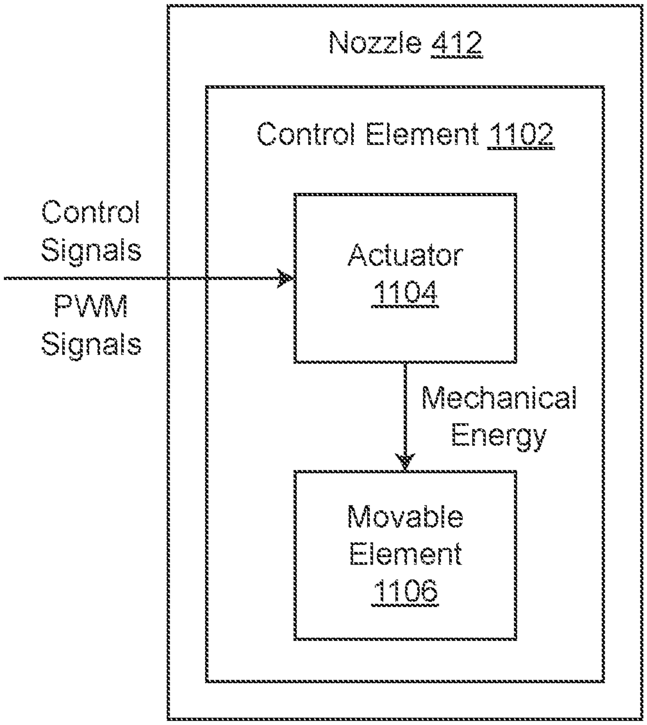
FIG. 11 is a block diagram of a variable flow nozzle of the fire suppression system of FIG. 1, according to an exemplary embodiment.

Referring particularly to FIG. 11, one of variable flow nozzles 412 is shown, according to some embodiments. Nozzle 412 may be a PWM nozzle, an adjustable needle valve nozzle, etc., or any other electronically controllable variable flow rate nozzle. In some embodiments, electronic control of the nozzle 412 includes using a controller or other device to selectively control the flow rates of the individual nozzles (e.g., such that the flow rate of each nozzle may be adjusted independently). Nozzle 412 is shown to include a control element 1102 that receives control signals from controller 100 (e.g., PWM signals). Control element 1102 is configured to operate to control, adjust, decrease, increase, etc., a flow rate or discharge rate of fire suppressant agent that is output by nozzle 412. Control element 1102 may operate to adjust or control the flow rate or discharge rate of fire suppressant agent in response to receiving the control signals or PWM signals from controller 100. For example, control element 1102 may be or include a PWM valve that actuates between a first and second position (e.g., an open and closed position) through operation of an actuator (e.g., an electric actuator) to achieve a desired flow rate or discharge rate as determined by controller 100 and indicated by the control signals and/or PWM signals. In other embodiments, control element 1102 can be or include a needle valve that is repositionable (e.g., infinitely repositionable or discretely repositionable) by a stepper motor to achieve a desired flow rate or discharge rate.

Referring still to FIG. 11, control element 1102 of nozzle 412 includes an actuator 1104 and a movable element 1106. In some embodiments, actuator 1104 is a linear electric actuator, a solenoid, an electric motor, a stepper motor, a piezo electric actuator, etc., or any other actuating element or device that is configured to generate mechanical energy. Actuator 1104 is configured to receive the control signals from controller 100 (or PWM signals from controller 100) and operate to generate mechanical energy to move (e.g., directly or indirectly) the movable element 1106. The movable element 1106 may be any component, valve, needle, etc., or nozzle 412 that is repositionable, reconfigurable, or movable to adjust, control, increase, decrease, etc., the flow rate or discharge rate of the fire suppressant agent output by nozzle 412. For example, actuator 1104 can be a PWM actuator that moves a pilot circuit valve which in turn causes the movable element 1106 to move or translate due to a differential pressure that acts on the movable element 1106.

Fire Suppression System Methods

Mechanically Activated Fire Suppression System

Figure 5:
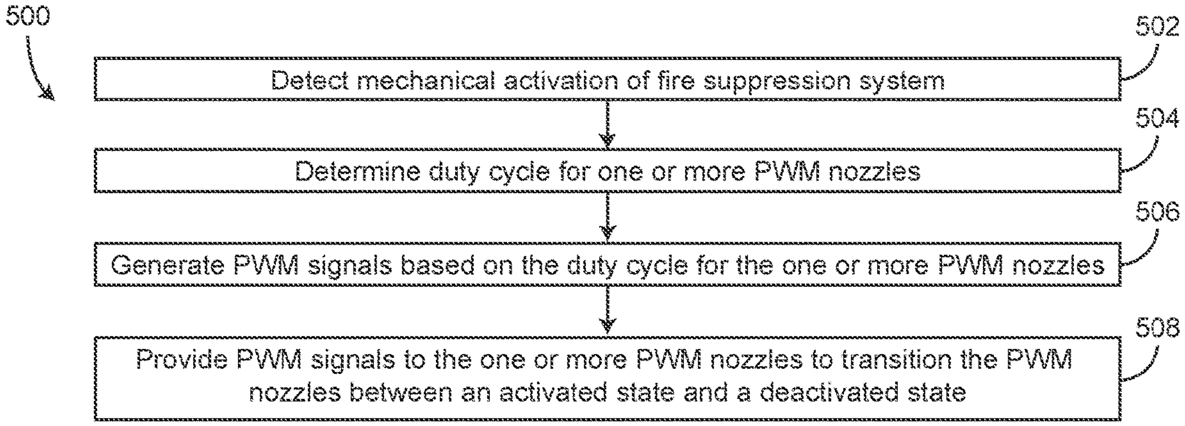
FIG. 5 is a flow diagram of a process for operating a mechanically activated fire suppression system, according to an exemplary embodiment.

Referring now to FIG. 5, a process 500 for electronically operating nozzles of a mechanically activated fire suppression system is shown. Process 500 can be performed by controller 100 when implemented in a mechanically activated fire suppression system. Process 500 combines both the mechanical activation with electronic control of PWM nozzles (e.g., variable flow nozzles 412). Process 500 can be used to operate variable flow nozzles 412 to provide fire suppressant agent at a desired discharge rate in a mechanically activated fire suppression system. In this way, variable flow nozzles 412 are mechanically activated by electronically controlled by controller 100.

Process 500 includes detecting mechanical activation of the fire suppression system (step 502), according to some embodiments. In some embodiments, the mechanical activation of the fire suppression system is detected based on sensor feedback. For example, a flow rate nozzle, a pressure nozzle, etc., can detect a change in flow rate or pressure through a delivery system (e.g., through a conduit, a pipe, a tubular member, etc.). In some embodiments, a current or a voltage that is associated with a fusible link or a glass bulb is measured. In some embodiments, step 502 is performed by discharge manager 416 and/or detection manager 424 based on sensor feedback information/signals.

Process 500 includes determining a duty cycle for one or more PWM nozzles (step 504), according to some embodiments. In some embodiments, the duty cycle is determined by discharge manager 416. In some embodiments, discharge manager 416 retrieves one or more fire suppression response profiles, programs, steps, functions, equations, etc., from response program database 418. Discharge manager 416 can input any system parameters (e.g., type of appliances in an associated area, size of area, spacing of variable flow nozzles 412, etc.) to the fire suppression response profiles, programs, steps, functions, equations, etc., to determine the duty cycle. In some embodiments, discharge manager 416 retrieves a duty cycle value from response program database 418 based on any of the system parameters.

Process 500 includes generating PWM signals based on the duty cycle for one or more of the PWM nozzles (step 506), according to some embodiments. In some embodiments, step 506 includes discharge manager 416 providing PWM generator 410 with the duty cycle value. In some embodiments, PWM generator 410 performs step 506. PWM generator 410 can use the duty cycle to generate a PWM signal (e.g., a square wave that transitions between a first value and a second value).

Process 500 includes providing the PWM signals to one or more of the PWM nozzles to transition the PWM nozzles between an activated state and a deactivated state (step 508), according to some embodiments. In some embodiments, step 508 is performed by PWM generator 410. In some embodiments, step 508 includes providing the PWM signals generated by PWM generator 410 to variable flow nozzles 412. In some embodiments, controller 100 is communicably connected with variable flow nozzles 412 via communications interface 408.

Electronically Activated Fire Suppression System

Figure 6:
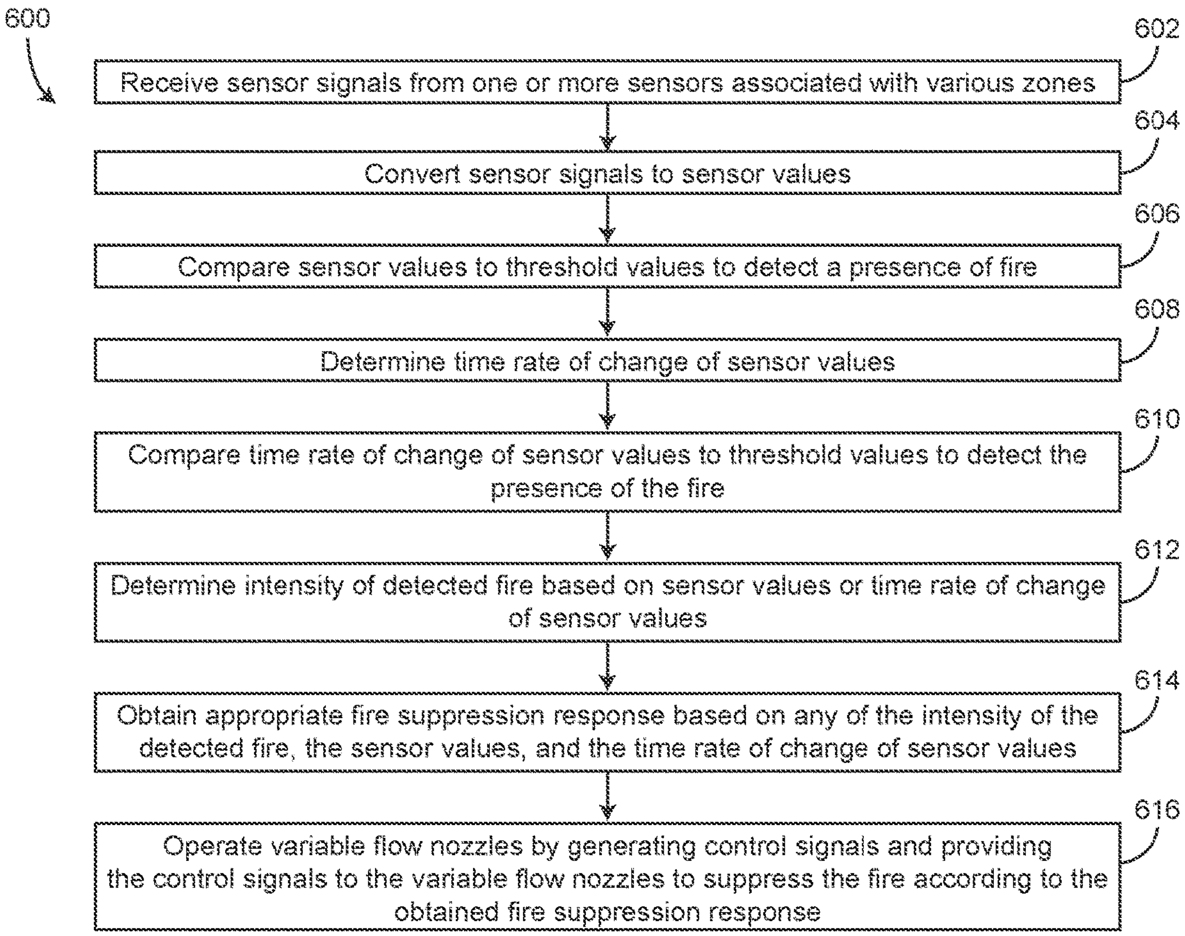
FIG. 6 is a flow diagram of a process for electrically activating and controlling a fire suppression system, according to an exemplary embodiment.

Referring now to FIG. 6, a process 600 for electronically activating and operating a fire suppression system is shown. Process 600 can be performed by controller 100 and sensors 414. In some embodiments, controller 100 is configured to perform process 600 to electronically activate and operate fire suppression system 10. Process 600 can be performed by controller 100 and fire suppression system 10 to detect a fire in area 51, activate fire suppression system 10 electrically in response to detecting a fire in area 51, and operate variable flow nozzles 412 to provide fire suppressant agent at a discharge rate to suppress the detected fire. Process 600 can also be used to retrieve or select a fire suppression response based on various parameters of the detected fire (e.g., temperature, intensity, rate of change of temperature, etc.) and adjust operation of variable flow nozzles 412 (and the discharge rate) accordingly.

Process 600 includes receiving sensor signals from one or more sensors associated with various zones (step 602), according to some embodiments. In some embodiments, step 602 is performed by sensor manager 422. In some embodiments, the sensor signals are received from any of sensors 414. For example, the sensor signals can be received from temperature sensors, heat sensors, light intensity detectors, optical sensors, etc., associated with various areas 40 of area 51. In some embodiments, each area 40 has an associated sensor or collection of sensors. In some embodiments, sensor manager 422 is configured to analyze any of the sensor signals received from sensors 414 to identify which area 40 the sensor signals are received from.

Process 600 includes converting the sensor signals to sensor values (step 604). In some embodiments, step 604 is performed by sensor manager 422. In some embodiments, sensor manager 422 is configured to convert any sensor signals (e.g., currents, voltages, etc.) received from sensors 414 to values (e.g., temperature, light intensity, etc.). Sensor manager 422 can use any of a linear relationship, a non-linear relationship, a lookup table (with interpolation and extrapolation), a set of equations, etc., to convert the sensor signals to sensor values.

Process 600 includes comparing the sensor values to threshold values to detect a presence of fire in any of areas 40 (step 606), according to some embodiments. In some embodiments, step 606 is performed by detection manager 424. Detection manager 424 can compare the sensor value(s) to corresponding threshold values to identify if any of the sensor value(s) exceed or are below an allowable threshold value. For example, detection manager 424 can compare a temperature sensor value to a maximum allowable temperature threshold value. In some embodiments, if the temperature sensor value exceeds the maximum allowable temperature threshold value or exceeds the maximum allowable temperature threshold value for a predetermined amount of time, detection manager 424 determines that a fire is present in the corresponding area. In some embodiments, step 606 is performed for any of the sensor data received from sensors 414. For example, step 606 can be performed to detect a presence of fire in any of areas 40.

Process 600 includes determining a time rate of change of the sensor values (step 608) and comparing the time rate of change values to threshold values to detect the presence of fire (step 610), according to some embodiments. In some embodiments, the time rate of change of the sensor values are determined by detection manager 424. In some embodiments, detection manager 424 monitors the sensor values over a time interval and determines a rate of change. In some embodiments, detection manager 424 compares the time rate of change of the sensor values to threshold values to determine if a fire is present in any of areas 40. In some embodiments, for example, if temperature is increasing in one of area 40 at a rapid pace that is greater than a threshold value, detection manager 424 determines that a fire is present.

Process 600 includes determining an intensity of the detected fire based on any of the sensor values and/or the time rate of change of the sensor values (step 612), according to some embodiments. In some embodiments, detection manager 424 performs step 612. Step 612 can include monitoring optical sensor feedback from an optical sensor, temperature sensor feedback from a feedback sensor, etc. In some embodiments, step 612 includes comparing any of the sensor values and/or the time rate of change of the sensor values to various ascending threshold values. For example, a temperature value that is within a first range of two threshold values can indicate that a low intensity fire is present, while a temperature value that is within a second range of two threshold values (a higher range) can indicate that a medium intensity fire is present, etc. Detection manager 424 can similarly use the time rate of change of the sensor values to determine an intensity of the detected fire.

Process 600 includes obtaining an appropriate fire suppression response based on any of the determine intensity of the detected fire, the sensor values, and the time rate of change of the sensor values (step 614), according to some embodiments. In some embodiments, discharge manager 416 retrieves the appropriate fire suppression response from response program database 418. In some embodiments, discharge manager 416 retrieves the appropriate fire suppression response based on any of the intensity of the fire, the sensor values, and the time rate of change of the sensor values. The appropriate fire suppression response can include a set of steps that fire suppression system 10 performs to suppress the fire. For example, the fire suppression response can include multiple discharge time intervals, and corresponding discharge rates. In an exemplary embodiment, the fire suppression response includes a first discharge time interval with a first discharge rate, and a second discharge time interval after the first discharge time interval with a second discharge rate, where the second discharge rate is less than the first discharge rate.

Process 600 includes operating variable flow nozzles by generating control signals and providing the control signals to the variable flow nozzles to suppress the fire according to the obtained fire suppression response (step 816), according to some embodiments. In some embodiments, step 616 is performed by discharge manager 416 and PWM generator 410. For example, step 616 can include determining a duty cycle value for various variable flow nozzles 412 that achieves the discharge rate determined by discharge manager 416. In some embodiments, step 616 includes performing steps 504-508 of process 500.

Active Response and Fire Targeting Fire Suppression

Figure 7:
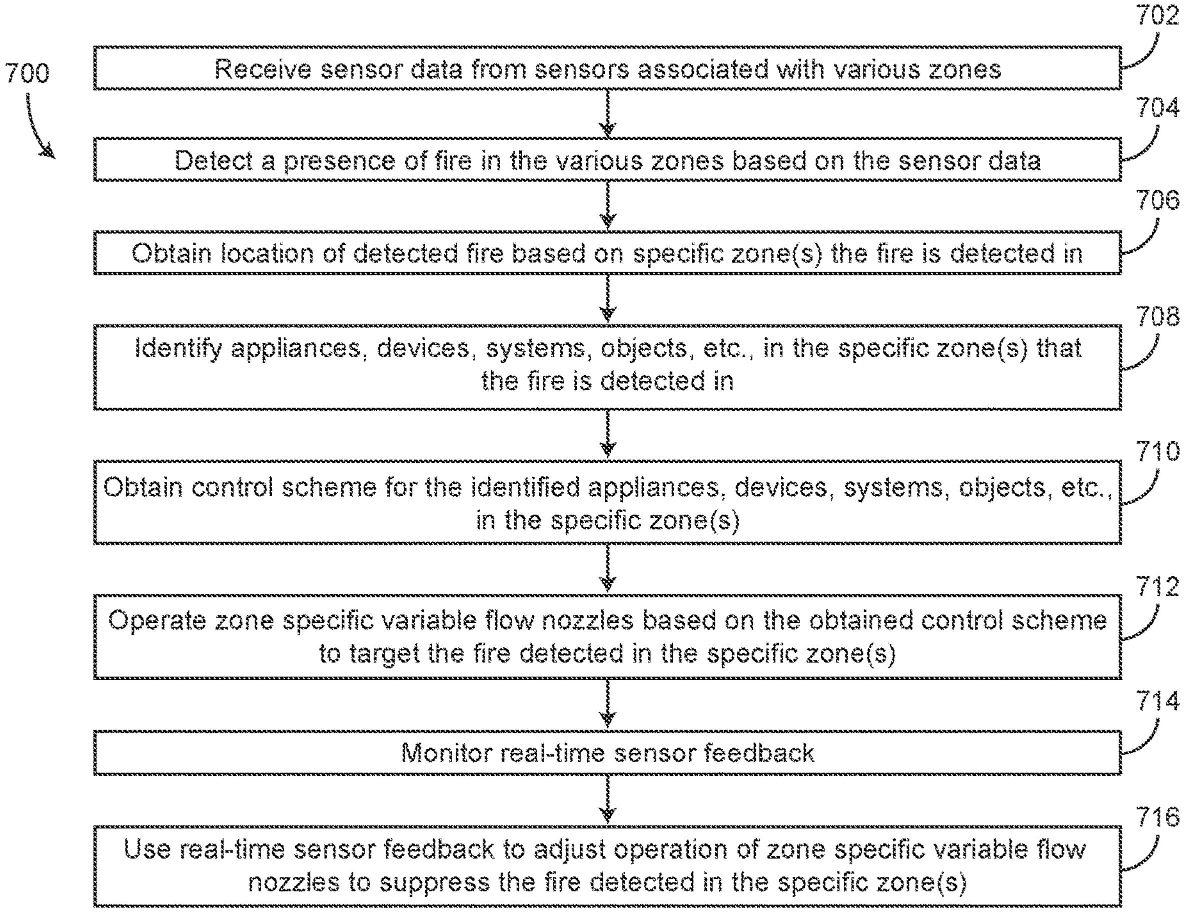
FIG. 7 is a flow diagram of a process for controlling a fire suppression system to detect, target, and actively suppress a fire, according to an exemplary embodiment.

Referring now to FIG. 7, a process 700 for performing active fire suppression and targeting a fire in an area is shown. Process 700 includes steps 702-716. Process 700 can be performed by controller 100 and fire suppression system 10 to detect, target, and actively respond to a fire. Process 700 can be performed by controller 100 to detect a fire, identify/determine a location of the fire, and activate variable flow nozzles 412 near or at the location of the fire to suppress the fire. Process 700 can also be performed by controller 100 to identify devices, apparatuses, appliances, systems, etc., at or near the location of the fire. Controller 100 can select a fire suppression response profile or a control scheme based on what type of appliances are at or near the fire. Controller 100 may operate variable flow nozzles 412 differently based on what type of appliances are at or near the fire. Controller 100 can also perform process 700 to operate variable flow nozzles 412 in response to changing conditions of the fire (e.g., temperature, intensity, rate of change of temperature, etc.). For example, if the intensity of the fire is detected to increase, controller 100 may increase the discharge rate of fire suppressant agent provided to the fire through variable flow nozzles 412 (or through variable flow nozzles 412 at the location of the fire) to suppress the fire. Process 700 can also be used to reactively control variable flow nozzles 412 to reduce flareups, and dynamically respond to changing conditions of the fire.

Process 700 includes receiving sensor data from sensors associated with various zones (step 702). In some embodiments, step 702 is the same as or similar to step 602. In some embodiments, step 702 includes performing steps 602-608 of process 600. Step 702 can include receiving any temperature, optical, heat, light intensity, etc., sensor data from sensors 414 in various areas 40.

Process 700 includes detecting a presence of fire in various zones (e.g., in areas 40) based on the received sensor data (step 704), according to some embodiments. Step 704 can include performing a fire detection algorithm or process based on any of the received sensor data. In some embodiments, step 704 includes performing any of steps 610-612 of process 600 to detect fire based on the received sensor data.

Process 700 includes obtaining a location of the detected fire based on the specific zones or areas in which the fire is detected (step 706), according to some embodiments. In some embodiments, step 706 is performed by detection manager 424 and/or discharge manager 416. In some embodiments, controller 100 includes a mapping, a database, etc., of approximate locations of areas 40 or the zones in which the sensors are positioned. Based on the fire detection and known/stored locations of sensors 414, an approximate location of the detected fire can be determined.

Process 700 includes identifying appliances, devices, systems, objects, etc., that are in the specific zone(s) or area(s) in which the fire is detected (step 708), according to some embodiments. In some embodiments, step 708 is performed by discharge manager 416. Discharge manager 416 can include a mapping or a database of the various appliances or types of devices in each of areas 40. For example, discharge manager 416 can retrieve or determine that a fryer is present in a particular area 40 in which the fire is detected.

Process 700 includes obtaining a control scheme for the identified appliances, devices, systems, objects, etc., in the specific zone (step 710). In some embodiments, step 710 is performed by discharge manager 416 and response program database 418. In some embodiments, discharge manager 416 uses any of the identified appliances, devices, systems, objects, etc., sensor data, fire intensity, etc., to determine which control scheme should be used. Particularly, different types of appliances may require different discharge rates, discharge time intervals, control schemes, etc.

Process 700 includes operating zone/area specific variable flow nozzles based on the obtained control scheme to target the fire detected in the specific zone(s) or area(a) (step 712), according to some embodiments. In some embodiments, step 712 is performed by discharge manager 416 and PWM generator 410. In some embodiments, discharge manager 416 uses the obtained control scheme to determine a discharge rate that should be provided to the fire to suppress the fire. In some embodiments, discharge manager 416 uses the obtained control scheme and current sensor data (e.g., current fire intensity, current temperature, current light intensity, etc.) to determine a duty cycle or a discharge rate. The control scheme can be an appliance specific control scheme as obtained in step 710. In some embodiments, discharge manager 416 also identifies which variable flow nozzles 412 should be operated to suppress the fire. For example, discharge manager 416 can operate variable flow nozzles 412 in the zone or area 40 that the fire is detected in, in addition to variable flow nozzles 412 that neighbor or are adjacent the zone or area 40. In some embodiments, discharge manager 416 uses real-time sensor data with the obtained control scheme to operate the specific variable flow nozzles 412 to target and suppress the fire. Advantageously, discharge manager 416 can respond to varying fire conditions in real time. For example, if the fire intensity increases, discharge manager 416 can determine that the discharge rate of fire suppressant agent should be increased, or that additional variable flow nozzles 412 should be activated to provide fire suppressant agent.

Process 700 includes monitoring real-time sensor feedback (step 714) and using the real-time sensor feedback to adjust an operation of zone specific variable flow nozzles to suppress the fire detected in the specific zone(s) or area(s) (step 716), according to some embodiments. In some embodiments, steps 714 and 716 are performed by discharge manager 416 and PWM generator 410. Discharge manager 416 can receive real-time sensor feedback from sensors 414 and use the appliance specific control scheme obtained in step 710 to determine active fire suppression response. In some embodiments, discharge manager 416 uses the real-time sensor feedback received from sensors 414 and the appliance specific control scheme to determine a duty cycle in real-time. Discharge manager 416 can provide the duty cycle in real-time to PWM generator 410. PWM generator 410 can generate PWM signals and provide the PWM signals or control signals to variable flow nozzles 412 in real-time to operate the zone specific variable flow nozzles 412 to target and actively respond/suppress the fire.

Artificial Intelligence Training

Figure 8:
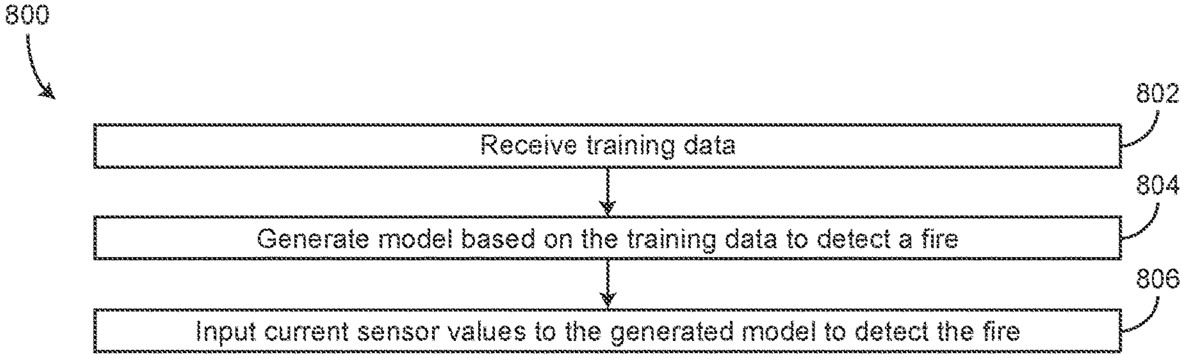
FIG. 8 is a flow diagram of a process for training and using a model to differentiate between an actual fire and routine activities, according to an exemplary embodiment.

Referring now to FIG. 8, a process 800 for training and using a model using a neural network is shown. Process 800 includes steps 802-806. In some embodiments, process 800 is performed by detection manager 424. Detection manager 424 can generate or use the model to differentiate between actual fires and typical activities in area 51 that can resemble a fire. Process 800 includes receiving training data, generating a model based on the training data, and using the generated model to detect a fire. The model can be generated using neural networks or artificial intelligence techniques. Advantageously, the model can be used to differentiate between actual fires and routine activities that may resemble a fire. The model facilitates a fire suppression (and detection) system that accurately and intelligently detects and responds to fires.

Process 800 includes receiving training data (step 802), according to some embodiments. In some embodiments, step 802 is performed by detection manager 424. In some embodiments, the training data includes output data and input data. The output data can be a binary variable (e.g., fire present, fire not present), and sensor data that results from a fire being present or from typical activities. For example, detection manager 424 can be provided with sensor data that results from an actual fire, and also sensor data that results from typical activities (e.g., using the appliance for routine activities). The training data can be obtained by performing a testing procedure. In some embodiments, an intensity of the fire is also provided as an input in the training data.

Process 800 includes generating a model based on the training data to detect a fire (step 804), according to some embodiments. In some embodiments, step 804 is performed by detection manager 424. In some embodiments, the model is generated using a neural network. In some embodiments, the model is configured to predict the output (e.g., whether a fire is present, or whether routine activities are being performed) based on inputs (e.g., sensor data received from sensors 414, fire intensity, etc.).

Process 800 includes inputting current sensor values to the generated model to detect a fire (step 806), according to some embodiments. In some embodiments, step 806 is performed by detection manager 424. Detection manager 424 can use the generated model with current or real-time sensor values as measured by sensors 414 to identify if an actual fire is present in areas 40. Advantageously, a neural network generated model can be used to accurately predict and differentiate between an actual fire and routine cooking activities that may be performed in area 51. This reduces the likelihood of a false activation.

Program Update

Figure 9:
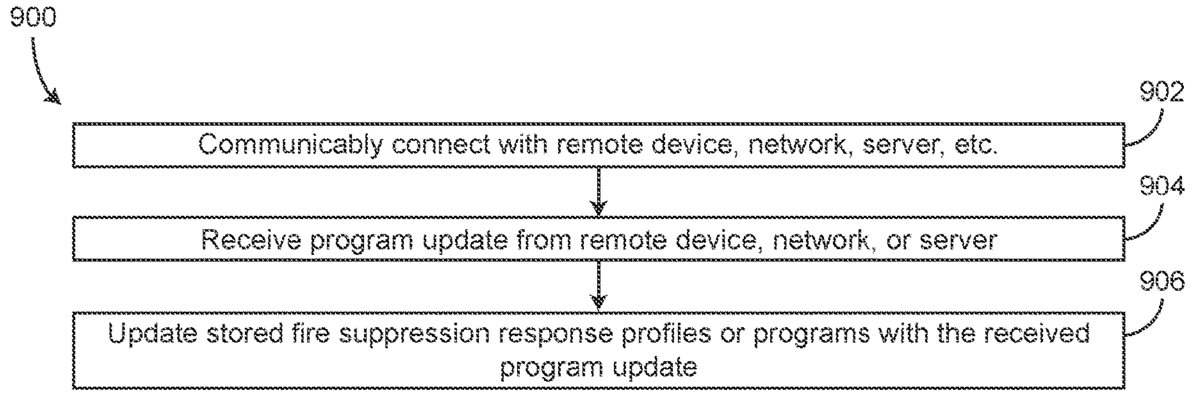
FIG. 9 is a flow diagram of a process for updating fire suppression response profiles or programs of the controller of FIG. 4, according to an exemplary embodiment.

Referring now to FIG. 9, a process 900 for updating fire suppression response profiles or program is shown. Process 900 includes steps 902-906. In some embodiments, process 900 is performed by controller 100. Specifically, process 900 can be performed by program updater 420. Process 900 can be performed by controller 100 and a remote network/device, or a local device. For example, process 900 can be performed by controller 100 with a locally connected device. A technician can locally connect with controller 100 and update the functionality of controller 100. The technician can locally connect with controller 100 with a computer to initiate process 900 to update controller 100. The update can re-assign various variable flow nozzles 412 to various control schemes used for fire suppression. The update can also indicate changes to appliance layout. For example, the update may notify controller 100 that a different type of appliance has been installed, removed, placed, etc., at a specific location in area 51.

Process 900 includes communicably connecting with a remote device, network, server, etc., (step 902), according to some embodiments. In some embodiments, step 902 includes communicably connecting controller 100 with remote network 450. Remote network 450 can be configured to provide updates to controller 100. In some embodiments, controller 100 is communicably connected with remote network 450 via a wired connection or a wireless connection (e.g., through wireless transceiver 428). Step 902 can be performed by an installer or a contractor when fire suppression system 10 is installed.

Process 900 includes receiving program updates from the remote device, network, server, etc., (step 904), according to some embodiments. In some embodiments, step 904 is performed by program updater 420. Program updater 420 can facilitate communication therebetween controller 100 and remote network 450. Program updater 420 can receive wirelessly transmitted updates to control schemes, fire suppression response profiles, methods, techniques, etc., used by controller 100.

Process 900 includes updating the stored fire suppression response profiles or programs with the received program update (step 906), according to some embodiments. In some embodiments, step 906 is performed by program updater 420 and response program database 418. In some embodiments, program updater 420 overwrites or updates fire suppression response profiles, programs, methods, techniques, programs, functions, etc., stored in response program database 418 and used by discharge manager 416. In some embodiments, step 906 also includes updating how discharge manager 416 selects or retrieves fire suppression response profiles or programs or control schemes from response program database 418. Once response program database 418 and/or discharge manager 416 are updated, controller 100 can use the updated program response database 418 and/or the updated discharge manager 416 for fire suppression (e.g., to control fire suppression system 10).

Advantageously, process 900 can be performed to remotely update fire suppression system 10 and change how fire suppression system 10 suppresses fires. This is advantageous, since the operation of fire suppression system 10 can be changed to account for appliance changes, layout changes, etc., without requiring structural changes to fire suppression system 10. Advantageously, fire suppression system 10 is versatile fire suppression system that can be adapted to physical changes of area 51.

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fire suppression system as shown in the various exemplary embodiments is illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

Additionally, any element disclosed in one embodiment may be incorporated or utilized with any other embodiment disclosed herein. It should be appreciated that other elements of the various embodiments may be incorporated or utilized with any of the other embodiments disclosed herein.

What is claimed is:

1. A fire suppression system comprising:

a controller configured to:

receive sensor data regarding a fire condition from a sensor indicating a location of an area in which the fire condition is detected;

determine a fire suppression response profile based on the sensor data and a type of appliance at the location that the fire condition is detected; and transmit a control signal to each of a plurality of electronically controllable variable flow rate nozzles, the control signal being pulse width modulated based on the fire suppression response profile, to selectively control a flow rate of each of the plurality of electronically controllable variable flow rate nozzles over time to provide a fire suppressant agent to a plurality of zones according to the fire suppression response profile, wherein the flow rate of each of the plurality of electronically controllable variable flow rate nozzles is independently adjustable by transitioning each of the electronically controllable variable flow rate nozzles between an activated state and a deactivated state over a time period.

2. The fire suppression system of claim 1, wherein the controller is configured to control operation of ones of the plurality of electronically controllable variable flow rate nozzles that are near or at a detected fire to target and suppress the detected fire.

3. The fire suppression system of claim 1, further comprising:

the plurality of electronically controllable variable flow rate nozzles configured to provide fire suppressant agent to the plurality of zones of an area; and the sensor configured to obtain sensor data regarding the fire condition at one or more of the plurality of zones of the area.

4. The fire suppression system of claim 1, wherein the controller is configured to modify the flow rate of the plurality of electronically controllable variable flow rate nozzles based on the fire condition changing.

5. The fire suppression system of claim 1, wherein the fire suppression response profile comprises one or more discharge time intervals and one or more discharge rates, wherein each of the one or more discharge rates is associated with a corresponding one of the one or more discharge time intervals.

6. The fire suppression system of claim 1, wherein the fire suppression response profile comprises a feedback control scheme that uses the received sensor data of the fire condition in real-time to control operation of one or more of the plurality of electronically controllable variable flow rate nozzles.

7. The fire suppression system of claim 1, wherein the fire suppression system is configured to automatically decrease or increase a response area within a protected zone based on the fire condition.

8. The fire suppression system of claim 1, wherein the fire suppression system is configured to automatically reactivate in response to an additional fire event occurring until an entirety of available fire suppressant agent is exhausted.

9. A method for operating variable flow rate nozzles to suppress a fire, the method comprising:

receiving fire condition data from a sensor indicating a location of an area in which a fire condition is detected;

detecting the fire condition based on the fire condition data;

determining a fire suppression response profile based on a type of appliance at the location that the fire condition is detected in response to detecting the fire condition;

modifying a flow rate of one or more of the variable flow rate nozzles over time according to the fire suppression response profile to suppress a fire by controlling the one or more variable flow rate nozzles using a pulse width modulated signal determined based on the fire suppression response profile, wherein the flow rate of each of the plurality of electronically controllable variable flow rate nozzles is independently adjustable by transitioning each of the electronically controllable variable flow rate nozzles between an activated state and a deactivated state.

10. The method of claim 9, wherein determining the fire suppression response profile comprises selecting a fire suppression response profile from a database of fire suppression response profiles based on at least one of:

whether a fire condition is detected in any of the zones of the area; or a location of the fire condition detected in any of the zones of the area.

11. The method of claim 9, further comprising:

controlling the operation of one or more of the variable flow rate nozzles that are near or at the detected fire to target and suppress the detected fire; and activating additional ones of the variable flow rate nozzles or deactivating ones of the variable flow rate nozzles in response to the fire condition changing.

12. The method of claim 9, wherein the fire suppression response profile is a control scheme, wherein the controller is configured to input real-time fire condition data to the control scheme to operate the variable flow rate nozzles.

13. A fire suppression system comprising:

a plurality of pulse width modulated (PWM) nozzles configured to provide fire suppressant agent to a plurality of zones of an area, wherein each of the plurality of PWM nozzles is configured to independently transition between an activated state and a deactivated state;

one or more sensors configured to obtain fire condition data at one or more of the plurality of zones of the area; and a controller configured to:

receive the fire condition data from the one or more sensors;

detect a presence of a fire condition in any of the zones of the area based on the fire condition data;

in response to detection of the presence of the fire condition, determine a fire suppression response profile based on a type of appliance at a location at which the fire condition is detected;

generate a pulse width modulation signal based on the fire suppression response profile; and provide the pulse width modulation signal to one or more of the plurality of PWM nozzles to operate the PWM nozzles to distribute the fire suppressant agent according to the fire suppression response profile, wherein the flow rate of each of the PWM nozzles is independently adjustable by adjusting the pulse width modulation signal of each of the PWM nozzles.

14. The fire suppression system of claim 13, wherein determining the fire suppression response profile comprises selecting a fire suppression response profile from a database of fire suppression response profiles based on at least one of:

whether a fire is detected in any of the zones of the area;

a location of the fire detected in any of the zones of the area; or an appliance type at the location of the fire.

15. The fire suppression system of claim 14, wherein the controller is configured to receive an update from a remote or local device to update the database with new fire suppression response profiles.

16. The fire suppression system of claim 13, further comprising a plurality of the one or more sensors, wherein each of the plurality of the one or more sensors are configured to obtain fire condition data at a corresponding zone of the area.

17. The fire suppression system of claim 13, wherein the controller is configured to modify the pulse width modulation signals provided to one or more of the plurality of PWM nozzles based on the fire condition data changing.

18. The fire suppression system of claim 13, wherein the fire suppression response profile comprises one or more discharge time intervals and one or more discharge rates, wherein each of the one or more discharge rates is associated with a corresponding one of the one or more discharge time intervals.

19. The fire suppression system of claim 13, wherein the fire suppression response profile is a feedback control scheme that uses the fire condition data in real-time to control operation of one or more of the plurality of PWM nozzles.

20. The fire suppression system of claim 13, wherein the fire suppression system is configured to automatically decrease or increase a response area within a protected zone based on the fire condition data.

* * * * *